United States Patent [19]
Piersol et al.

[11] Patent Number: 5,745,910
[45] Date of Patent: Apr. 28, 1998

[54] FRAME STRUCTURE WHICH PROVIDES AN INTERFACE BETWEEN PARTS OF A COMPOUND DOCUMENT

[75] Inventors: Kurt W. Piersol; Joshua B. Susser, both of Santa Cruz; Richard C. Rodseth, Saratoga, all of Calif.

[73] Assignee: Apple Computer, Inc., Cupertino, Calif.

[21] Appl. No.: 633,350

[22] Filed: Apr. 17, 1996

Related U.S. Application Data

[63] Continuation of Ser. No. 175,549, Dec. 30, 1993, abandoned, which is a continuation-in-part of Ser. No. 58,260, May 10, 1993.

[51] Int. Cl.$^6$ ........................................... G06T 1/00
[52] U.S. Cl. ........................ 707/515; 707/520; 345/339
[58] Field of Search ........................ 395/777, 133–134, 395/761, 776, 778, 779, 782, 792, 326, 340, 344–346, 348–350, 135

[56] References Cited

U.S. PATENT DOCUMENTS

| | | | |
|---|---|---|---|
| 4,868,765 | 9/1989 | Diefendorff | 364/521 |
| 4,933,880 | 6/1990 | Borgendale et al. | |
| 5,140,677 | 8/1992 | Fleming et al. | 395/159 |
| 5,142,618 | 8/1992 | Fujiwara et al. | 395/146 |
| 5,243,691 | 9/1993 | Kuwabara | |

FOREIGN PATENT DOCUMENTS

| | | |
|---|---|---|
| 0 173 125 | 3/1986 | European Pat. Off. |
| 0215203A3 | 3/1987 | European Pat. Off. |
| 0513553A2 | 11/1992 | European Pat. Off. |
| 0 530 122A1 | 3/1993 | European Pat. Off. |
| WO92/08199 | 5/1992 | WIPO |

OTHER PUBLICATIONS

Bruning et al, RagTime 2, ch. 2 (pp. 20, 33), ch. 3 (pp. 6–7, 10), ch. 4 (pp. 5, 16), ch. 5 (pp. 5, 24), ch. 6 (p. 5), ch. 7 (pp. 5, 7), 1987.

Lin, Jin–Kun, "A Multimedia and Multisource Document Editor of an Open Architecture", SIGDOC '92, pp. 57–62.

UIST Fourth Annual Symposium on User Interface Software and Technology, "Embedded Buttons: Documents as User interfaces", Nov. 11–13, 1991, pp. 45–53.

Berry, R.E., "The Designer's Model of the CUA Workplace", *IBM Systems Journal*, vol. 31, No. 3, 1992, pp. 429–458.

"Implementing Implicit Drag Along Without Regard to Object Set Type", *IBM Technical Disclosure Bulletin*, vol. 27, No. 10A, Mar. 1985, p. 5518.

Olsen, D.R. et al., "Workspaces: An Architecture for Editing Collections of Objects", *CHI'92 Conference Proceedings*, May 7, 1992, Monterey, California, pp. 267–272.

"Common Editing Arrangement for Different Object Types in Text Processing", *IBM Technical Disclosure Bulletin*, vol. 27, No. 9, Feb. 1985, pp. 5049–5052.

"Dragging Marked Data to an Editor Window", *IBM Technical Disclosure Bulletin*, vol. 34, No. 10B, Mar. 1992, pp. 202–203.

*Primary Examiner*—Joseph H. Feild
*Attorney, Agent, or Firm*—Burns, Doane, Swecker & Mathis, L.L.P.

[57] ABSTRACT

A document-centered user interface architecture for a computer system employs parts as the fundamental building blocks of all documents. All data is stored in the system as a part, which is comprised of contents and an associated editor. The contents and the functionality of the editor are available to the user wherever the part is located, whether in a document, on a desktop or in a folder. Parts function as containers for other parts, thereby facilitating the compilation and editing of multimedia or compound documents. A data structure, labelled a frame, functions as an interface between a container part and an embedded part, and allows the two parts to negotiate with respect to graphic structure without requiring extensive knowledge of one another's internal constraints.

26 Claims, 24 Drawing Sheets

FIG. 6B

FRAME STRUCTURE WHICH PROVIDES AN INTERFACE BETWEEN PARTS OF A COMPOUND DOCUMENT

This application is a continuation, of application Ser. No. 08/175,549, filed Dec. 30, 1993, abandoned which is a continuation-in-part of application Ser. No. 08/058,260, filed May 10, 1993 pending.

FIELD OF THE INVENTION

The present invention is directed to the interface between a computer and the human user of that computer, and more particularly to a computer-human interface architecture that provides increased flexibility in the creation and manipulation of compound documents.

BACKGROUND OF THE INVENTION

Currently, many applications for use in personal computers are written as single monolithic programs, each of which is designed with a specific primary function to be performed. For example, word processing programs are designed to create and edit textual documents. Although not designed for text processing, many other types of programs also provide for incidental use of text. For example, spreadsheet programs enable text to be inserted in the spreadsheet as descriptors for rows and columns of information. Similarly, graphics applications such as painting and drawing programs provide for the use of text as labels within the paintings and drawings. While all of these different types of programs provide text editing facilities, they differ in the specific manner in which text is edited. Some of the applications provide a large number of capabilities for this function, while others are quite limited. Consequently, users are required to learn a different way to perform the same task, i.e. edit text, for each of the different types of applications.

It is desirable, therefore, to provide an architecture in which a component of a document, such as text, can be employed wherever needed while at the same time be created and edited in a consistent manner, regardless of the particular environment in which it resides. With such an approach, the same set of commands can be used to edit text whether it is present in a word processing document, a spreadsheet, a graphic document or any other document. The user only has to learn about one text editor, and can thereby become more comfortable with the editing process.

Further along these lines, it is desirable to be able to edit the components of a compound document within the document itself. In the context of the present invention, a compound document is one in which two or more different types of programs are used to produce the appearance of a single unified piece of information. For example, it could be a text document which includes a drawing created by a graphics program. These two types of information have a containment relationship to one another. More particularly, the text document functions as a container for the graphic object, such that the graphic object moves with and is affected by the text (container) document.

In the past, a compound document of this type would be created by running two separate applications. A word processing program was used to generate the textual portion of the document. A separate graphics application was used to generate the drawing. To incorporate the work products of these two programs into a single document, the drawing would be stored in a particular data type or format, and the contents of this data structure would be placed in the word processing document, for example by using a cut and paste operation. Often, the merging of these separate pieces of information into a single document was accomplished through a third application program, referred to as a presentation manager.

Once the drawing was embedded in the word processing document, its contents became static. If the drawing needed to be changed, it was necessary for the user to call up the graphics program, retrieve the original drawing, and edit that drawing within that program. The editing took place outside of the compound document, and the user could not view the changes in context as they were being made. The revised drawing would then have to be embedded in the word processing document, in place of the original drawing.

To overcome the need to switch between various applications, it is desirable to provide an approach which enables the various components of a compound document to be edited within the document itself. Not only does this approach save time and simplify the procedure, it enables the user to see the changes in context as they are being made.

Accordingly, it is an objective of the present invention to provide a system in which a consistent user interface can be provided for a task, regardless of the environment in which the task is to be performed. Further along these lines, it is an objective of the present invention to provide a novel data structure which serves as an interface between the containing and embedded parts of a compound document, to facilitate cooperation between these parts.

BRIEF STATEMENT OF THE INVENTION

In pursuit of these objectives, the present invention provides a uniform interface that enables all different kinds of information-conveying elements to be combined and manipulated within documents in ways that were not previously possible. In the context of the present invention, a document is considered to be the element of an interface whose purpose is to present information to the user and allow that information to be edited, for example a text document or a graphics document.

The uniformity of the interface is provided through a document-centered architecture which employs a fundamental building block, hereinafter referred to as a "part", to accomplish tasks. A part is a self-contained element that is comprised of two primary components, its content and a manipulator for that content. These two components are always available to the user, regardless of where the part may reside within the system, e.g. as an element of a document, in a folder, or on a desktop. The manipulator for the part can be any type of editor or viewer for the contents of the part, and it can be selected by the user, if necessary. For example, if the contents of a part is text, the editor which is a component of that part can be any word processor with which the user has familiarity. That word processor can be used to edit the textual contents of the part, wherever they may be embedded. Thus, even if the part is embedded within a nontextual document, e.g. a spreadsheet, the textual contents of the part can still be edited with the user-selected word processor.

An interface which exhibits this feature has a significant inherent characteristic: it is simultaneously simpler and more powerful. The simplicity results from the fact that the user only has to learn one way to perform a particular task, such as editing text. At the same time, it is more powerful because the text editor can be a fully functional module, which replaces less capable ones currently found in many types of applications.

The two basic components of a part enable it to function as both an object (due to its inherent contents) and as an application (resulting from its inherent manipulator or editor). Due to these characteristics, a part can provide a number of different functions. For example, every document is a part, and every part can act as a document. To illustrate, a text part is a document containing characters, and a graphic part is a document containing lines and circles.

Another feature of the part is that it functions as a container, i.e. a part is able to contain other parts. Furthermore, a part is not limited to the types of parts that it contains. Rather, if a part can contain any type of part, it can contain all types of parts. This feature of the part renders the present invention an ideal architecture for the creation of compound documents. Since a document can contain parts, it will automatically be able to contain all types of parts representing different types of information, without any modification of the document or the manipulator.

These features result in a user interface in which compound documents are assembled by arranging different parts in a manner which produces a desired result. In this sense, the interface of the present invention is document-centered, rather than being application oriented. More particularly, a conventional application program does not have any role in the interface of the present invention which is separate from the data with which it is bundled to form a part.

Another aspect of this interface is the manner in which parts are represented to the user. A part can be represented as an icon, which is a small picture that provides a handle for the part, allowing it to be manipulated as a whole. For example, an icon can be dragged on a desktop and between windows, and can be the destination for dropping other icons during a drag operation. Also, the contents of a part can be expanded into the workspace defined by a window on a desktop, similar to conventional applications.

Parts can be alternately represented as frames. A frame is an area of a display screen that represents a part. Like an icon, frames provide handles onto parts that allow them to be manipulated as a whole. They can be dragged on the desktop and between windows, they can provide the destination for drops during drag operations, and they can be opened into windows and closed back into frames. Unlike an icon, however, a frame allows a part's contents to be seen and edited in place.

A frame is a data structure which functions as an interface between a containing part, e.g. a document, and an embedded part. The frame consists of a number of attributes, some of which are controlled by the containing part and some by the embedded part. Through the intermediary of the frame, the manipulators for the containing part and the embedded part can negotiate the space allotment that is provided to the embedded part within the containing part.

By utilizing parts as the fundamental building blocks for the user interface, capabilities are provided that were not previously available in personal computer applications. These capabilities are described hereinafter with reference to specific examples of preferred embodiments of the invention.

DETAILED DESCRIPTION

To facilitate an understanding of the present invention and the advantages offered thereby, features of the invention are described and illustrated with reference to the use of the invention in a Macintosh® brand computer supplied by Apple Computer, Inc. It will be appreciated by those having familiarity with the relevant technology, however, that the principles of the invention are not limited to this particular type of operating environment. Rather, the concepts which underlie the invention are applicable to any type of computer operating system in which it is desirable to provide a uniform interface for the compilation and editing of documents, particularly compound documents.

Figure 1:
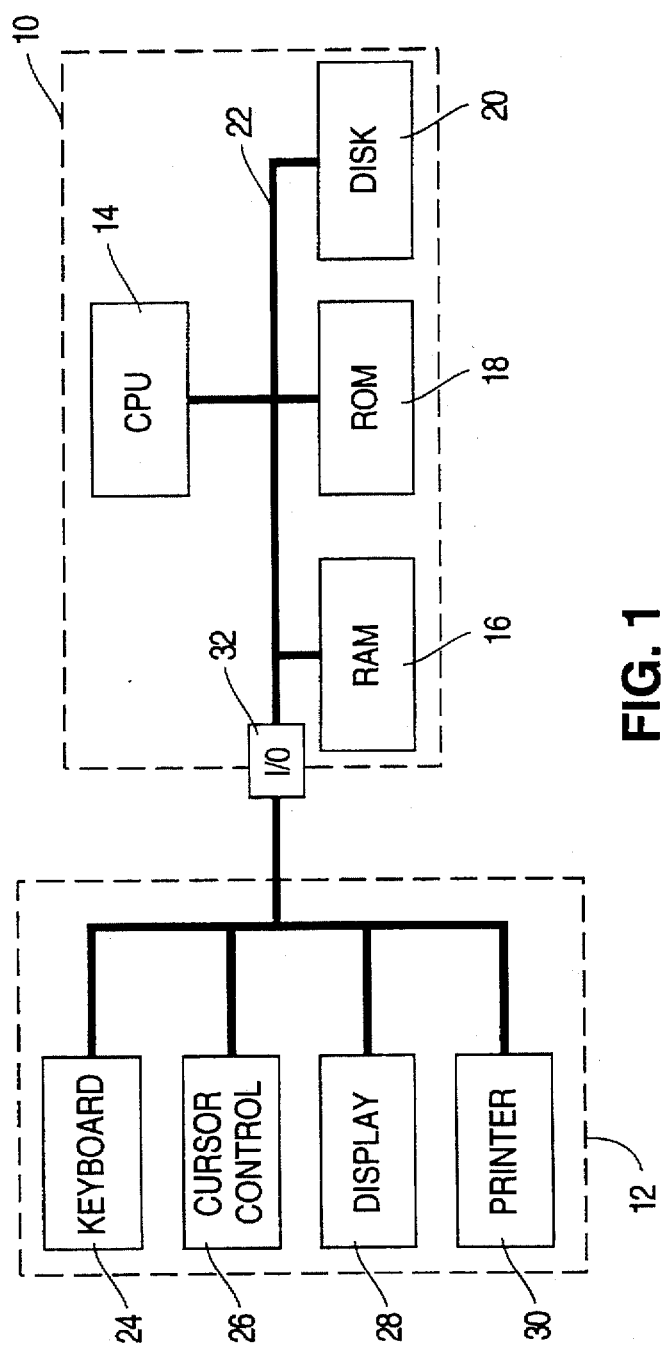
FIG. 1 is a block diagram of the main components of a computer system.

A typical computer system, of the type in which the present invention can be employed, is illustrated in block diagram form in FIG. 1. The structure of the computer itself does not form part of the present invention. It is briefly described here for subsequent understanding of the manner in which the features of the invention cooperate with the structure of the computer. Referring to FIG. 1, the system includes a computer 10 having a variety of external peripheral devices 12 connected thereto. The computer 10 includes a central processing unit 14, a main memory which is typically implemented in the form of a random access memory 16, a static memory that can comprise a read only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26 such as a mouse, trackball or the like. A display device 28, such as a CRT monitor or an LCD screen, provides a visual display of the information that is being processed within the computer, for example the contents of a document. A hard copy of this information can be provided through a printer 30, or similar such device. Each of these external peripheral devices communicates with the CPU 14 by means of one or more input/output ports 32 on the computer.

Figure 2A:
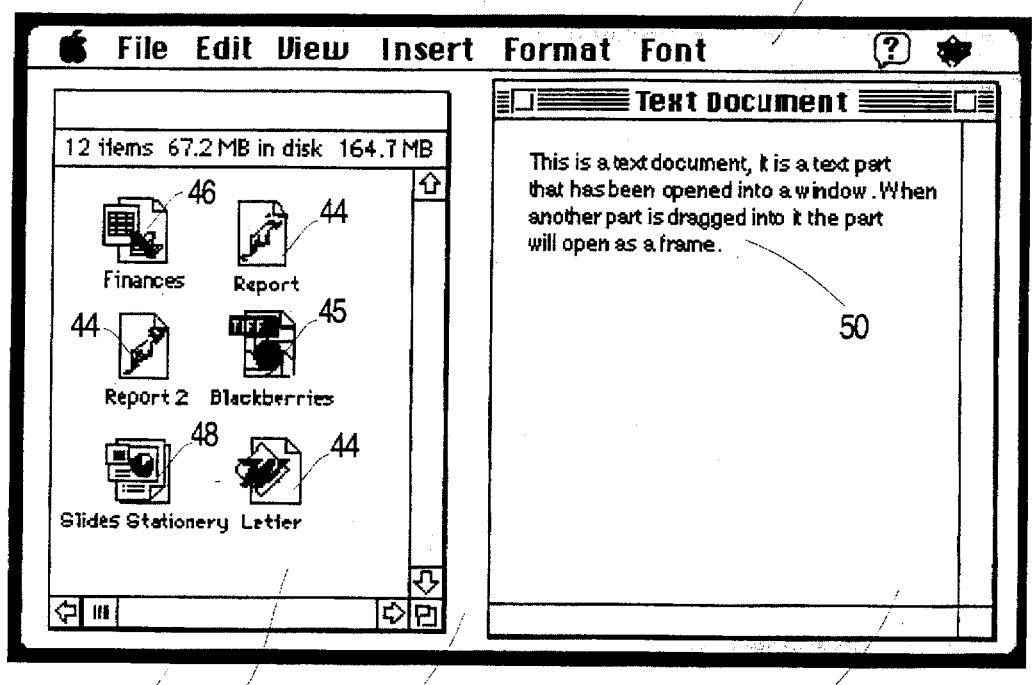
FIGS. 2A and 2B are two views of a screen display, illustrating the dragging of a part from a folder to a document.
Figure 2B:
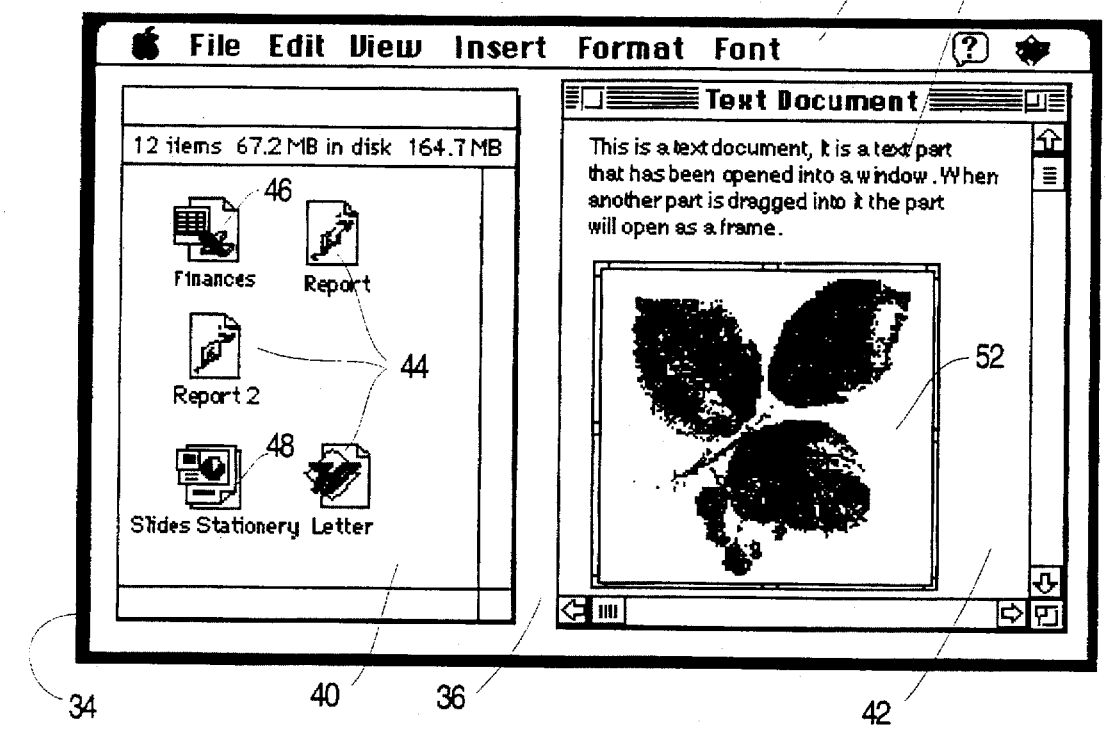

The present invention is particularly directed to a system which controls the manner in which the CPU 14 handles information that is manipulated by the keyboard 24 and the cursor control device 26, as well as the manner in which that manipulated information is portrayed to the user through the display device 30. An example of an interface which employs the principles of the present invention is illustrated in FIGS. 2A and 2B. These figures illustrate a desktop 34 which defines a workspace 36. Also included on the desktop is a menu bar 38. Within the workspace 36 are two windows, 40 and 42. The left-hand window 40 is a folder window which contains icons representing various parts. As shown in FIG. 2A, three icons 44 pertain to text parts, a fourth icon 45 represent a graphic part and another icon 46 represents a spreadsheet part. A sixth icon 48 is a stationery icon representing a part that can be used for the creation of presentation slides. In FIG. 2A the right-hand window 42 contains a text document. More particularly, the document includes a text part 50. This text part can be created by typing text within the window 42, or by opening in the window a previously-created text part that was represented by an icon.

FIG. 2B illustrates the result of an operation in which the graphic icon 45 has been dragged from the folder in the left window 40 to the text document in the right window 42. As is known in user interfaces which provide a desktop metaphor, such as that shown in FIGS. 2A and 2B, dragging is an operation in which objects can be moved or copied on the desktop and within windows through the actuation of the cursor control device 26. Once the graphic icon is placed within the document, its contents are displayed in a frame 52. Since the document now contains a graphic element as well as a text element, it is referred to as a compound document.

In a compound document, different program executables, e.g. editors, cooperate to produce the appearance of a single unified piece of information. Each such executable controls one segment, i.e. part, of the total information content of the document. Containment is used to relate the parts of the document to one another. Containment represents a logical relationship in which the user expects the contained, or embedded, part to move with and be affected by the container part.

The text 50 and the graphic element within the frame 52 pertain to separate respective parts which together make up the compound document. As described previously, a part is a self-contained entity which is comprised of content and a manipulator for that content. These two components are always available when the part is accessed, regardless of where it is located on the desktop. Thus, when the graphic icon 45 is located in the folder of window 40, as in FIG. 2A, it represents a part comprising a graphic element and an editor for that element. When the part is moved to the document in the window 42, its contents go with it and the functionality of an editor for those contents is available to the user.

The significance of this feature is the fact that the contents of a part can always be edited, or otherwise manipulated, wherever they are located. Thus, in the compound document of FIG. 2B, the textual content 50 can be edited within the document, for example by using the same word processor that was used to originally create the text. Since the graphic editor is present as a component of the part within the frame 52, it enables the graphical contents of the part to be directly edited in place. Thus, unlike prior applications for personal computers, it is not necessary for the user to open a graphics application, for example in another window on the desktop 34, edit the graphical information as desired, and then export the edited graphics into the document in the window 42. Rather, the user can directly edit the contents of the frame 52 within the context of the document in the window 42, without having to implement any intervening steps. The user can focus on document content, rather than an application program, and take advantage of the context provided by the surrounding document.

A part, therefore, is a self-contained object which is autonomous of the underlying system technology. It can be used in any type of software engine or environment, and the user does not have to learn the operation of a particular editor for the part. As long as an editor for that category of part is represented in the underlying system, the user can take full advantage of the part's capabilities. Furthermore, if a text part was created with a particular text editor (word processor), the user is not constrained to use only that text editor with the part. If the user has more familiarity with the commands of a different word processor, that processor can be designated as the preferred editor for all text parts in the computer system.

Parts are not limited to documents and their contents. Rather, every object in the system comprises a part. Thus, the folder in the window 40 is a part whose contents are the icons 44–48. Similarly, the desktop 34 is itself a part, as well as dialogue boxes and other user interface objects.

Frames and icons are alternative representations of a part. Users can toggle between the frame and icon representations of a part by means of a suitable keyboard or menu command. If a document is large, e.g. it consists of several pages, only a portion of it is visible in the frame. Therefore, frames, like icons, can be opened into windows, to thereby allow all of the contents of large parts to be seen, through scrolling for example, and edited using the functions available with a window, such as magnification. Similarly, they can be closed from a window back into a frame. A frame differs from an icon, in that it allows its contents to be edited in place. A frame is also different from a window because a frame, or even multiple frames, can exist inside a window. A window is a transitory view of objects, which remains open only while a part is being edited or examined. In contrast, a frame is a persistent representation of a part's contents.

A part, whether it is in the form of an icon or a frame, can act as a container for other parts. In the example of FIG. 2B, the text 50 is located within a frame whose border is the same as that of the window 42. This larger frame contains the smaller frame 52 for the graphic part. Since the text part is the outermost part in the window, it is labelled as the "root part". Generally speaking, the root part establishes the basic editing behavior for a window.

A root part can be generated by means of a stationery icon, such as the icon 48 depicted in FIG. 2A. In general, a stationery icon represents a predefined part and functions as a metaphor for a pad of paper in the physical world. When a new document is to be generated, a person tears a blank sheet of paper from the pad and places the contents of the document, e.g. words, drawings, etc., on it. The stationery icon works in the same manner. When the user desires to create a new text document, a text stationery icon is opened, for example by double-clicking on it. In response, the stationery icon creates (or "tears off") a copy of itself, which is opened into a window or a frame. This copy is an ordinary part which can be blank, i.e. it has no contents initially, or it could have certain pre-set information, such as letterhead or a company logo. The user then enters additional content, e.g. characters, into the document.

The stationery itself is not opened as a window or a frame; it only exists as an icon. Only the torn-off copy is opened. Thus, when a stationery icon is dragged into a document, rather than opening itself into a frame, a copy is "torn off", placed in the document, and that copy is opened into a frame. The stationery icon itself returns to the position it occupied before the move. This prevents the stationery from being accidentally inserted into a document, and possibly lost.

Figure 3A:
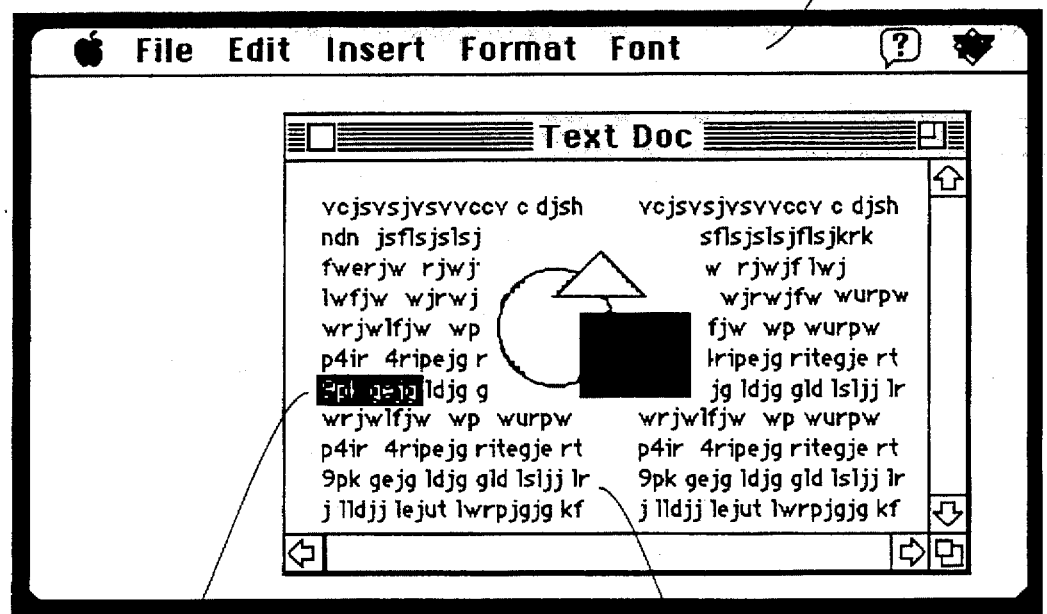
FIGS. 3A and 3B are two views of a screen display, illustrating the activation of frames.
Figure 3B:
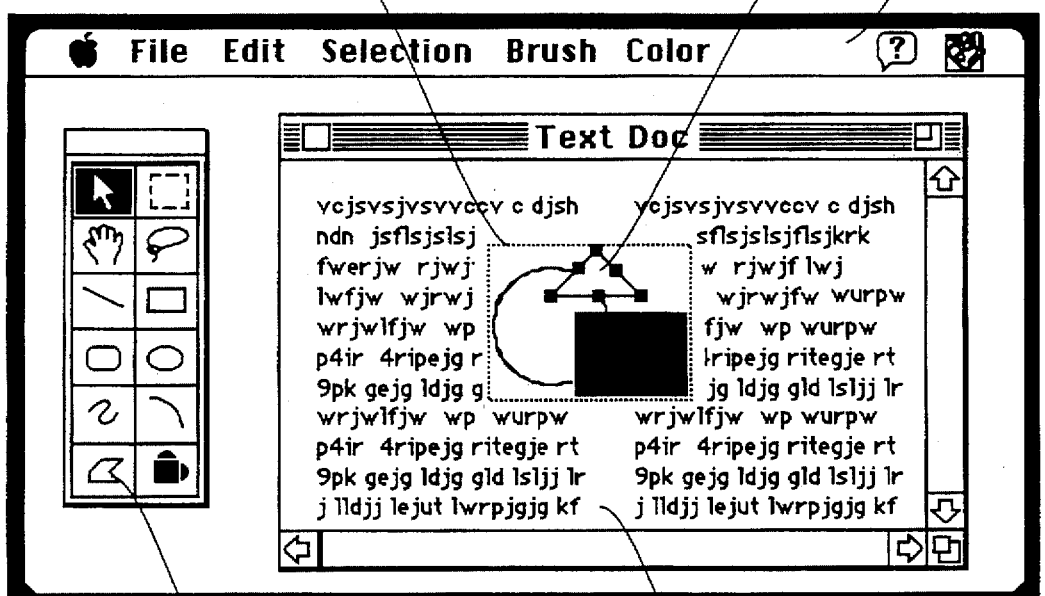

Since a frame can function as a container, it exhibits some of the known properties of a window. For example, when a user selects the intrinsic contents in a frame, such as a graphical object, the frame containing the selected contents becomes active. When a part is active, it receives commands and keyboard events, and its menu and other user interface options are displayed. An example of the activation of a frame is illustrated in FIGS. 3A and 3B. FIG. 3A illustrates a desktop having a window 54 which includes a compound document containing text and a graphic part. In this compound document, the text forms the root part of the document. In the example of FIG. 3A, a portion 56 of the text has been selected, and is represented by the reverse video display. In this case, the frame which contains the selected part is contiguous with the border of the window itself. The menu bar 58 for the desktop includes those commands which are appropriate for editing the text.

FIG. 3B illustrates an example in which a graphical component, i.e. the triangle 60, has been selected. The frame which contains this graphical component is now active, and its border is indicated by the dotted line 62. Since the active frame is now a graphic part, the commands in the menu bar 58 have changed to those which are appropriate for editing graphical content. In addition, a palette 64 is displayed on the desktop, to provide those tools which are necessary for editing the graphical contents of the active frame.

Figure 4:
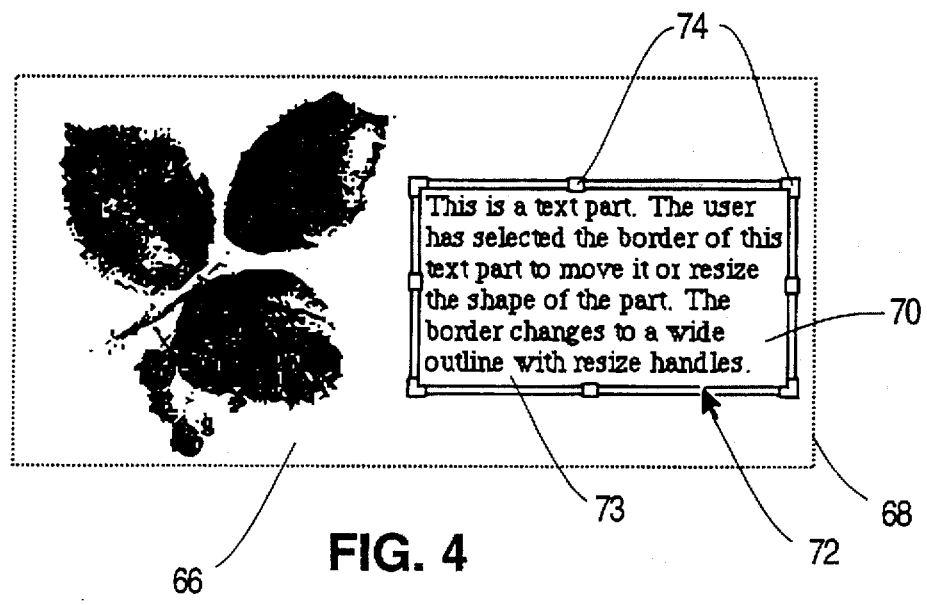
FIG. 4 is an illustration of a selected frame within an active frame.

In addition to activating frames, a user may also select them. The selection of a frame can be accomplished, for example, by activating a frame so that its border is visible, and then pressing a button on the cursor control device while the pointer of the cursor is positioned over the border of the frame. FIG. 4 illustrates a frame 66 that contains both graphical and textual content. The border 68 of the frame is indicated by a dotted line, to denote the fact that it is an active frame. Within this active frame is a frame 70 containing the textual content. This frame has been selected by depressing the button of the cursor control device, while the pointer of the cursor 72 is positioned over the border 73 of the frame. To denote the fact that the frame 72 has been selected, the border 73 of the selected frame 72 has a different appearance from that of the active frame 66. For example, the border might be wider as shown in FIG. 4. In addition, it can be provided with resize handles 74, which enable the size and shape of the frame to be changed in a known manner.

In general, whenever a part or some of the contents of a part is selected, the smallest frame containing the selected element becomes the active frame. Thus, if a word within the frame 70 is selected, for example by clicking a cursor control button while the cursor is positioned over the word, the frame 70 changes state from selected to active. At the same time, the border 68 of the frame 66 disappears from view since this frame is neither active nor selected. Conversely, if the frame 66 is selected by clicking on its border 68, the border 73 disappears, the border 68 changes appearance, and the border of the frame (or window) containing the frame 66 (not shown in FIG. 4) is highlighted to show that it is active.

In the examples of FIGS. 3A, 3B and 4, the frames are illustrated as having a rectangular shape. While this shape is preferable for displaying the contents of most types of parts, the shape of the frame need not be limited to being rectangular. Rather, the frame can have any shape which suits the display of its contents.

Figure 5:
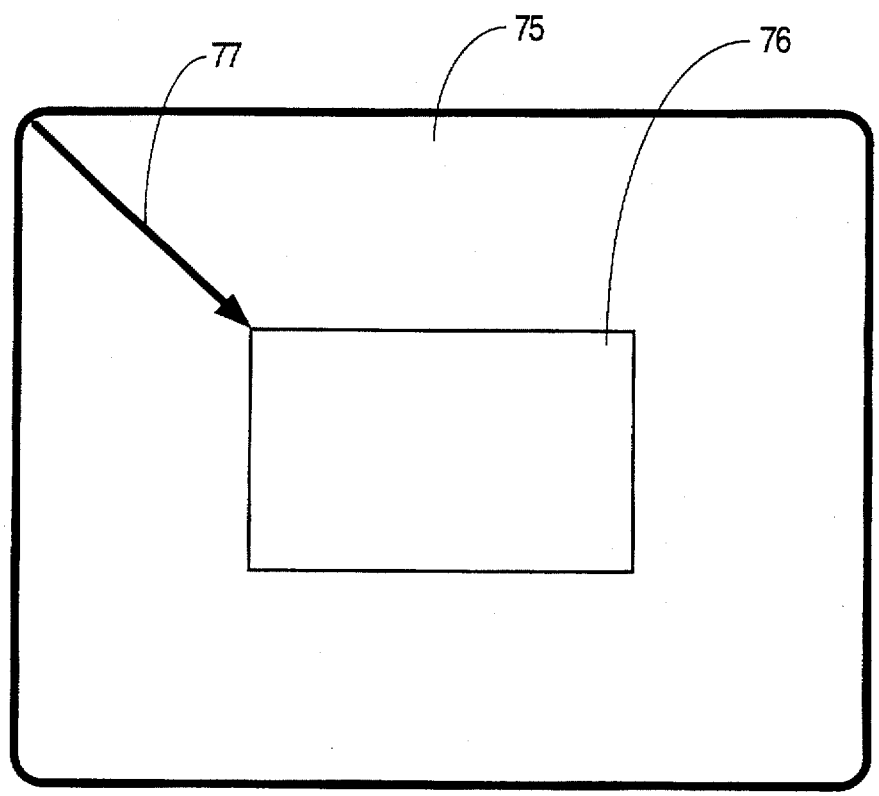
FIG. 5 is an illustration of the basic primitives for defining the layout of a compound document.

The frame is not an element of the part itself. Rather, a frame is one of three separate data structures which form the primitives for defining the layout of a document. These three data structures comprise a canvas, a frame and a transformation. Referring to FIG. 5, the canvas 75 is a data structure which represents the overall context of the document. It includes a description of coordinate space, and a mechanism for capturing a series of graphical commands into an image or representation. Examples of canvasses are a bit or pixel map on a computer screen, a page description language for a printer, and a display list for a computer display.

The frame 76 is the data structure which serves as a shared information repository between a container part and an embedded part. A transformation is a data structure which represents a set of geometric descriptions that are applied to graphical commands. In the example of FIG. 5, the transformation is depicted as an offset 77 from a reference point, e.g. the upper left-hand corner of the canvas 75. Other types of transformations include scaling, rotation, skews and distortions. Generally speaking, the transformation is a geometric description of the location and orientation of the frame 76 on the canvas 75. It can be two-dimensional or three-dimensional in nature.

To function as an interface between the container part and the embedded part, each frame is a data structure having a number of characteristic attributes. Some of these attributes are denoted as various "shapes". Each of these shapes represents a geometric description of an area that defines certain document context that is shared between the container part and the embedded part. Some of the shapes are controlled by the container part, whereas others are determined by the embedded part. In general, these various shapes can represent any area of the coordinate space of the document context, i.e. the canvas. In this regard, the shapes of a frame can represent disjoint areas as well as contiguous areas.

Figure 6A:
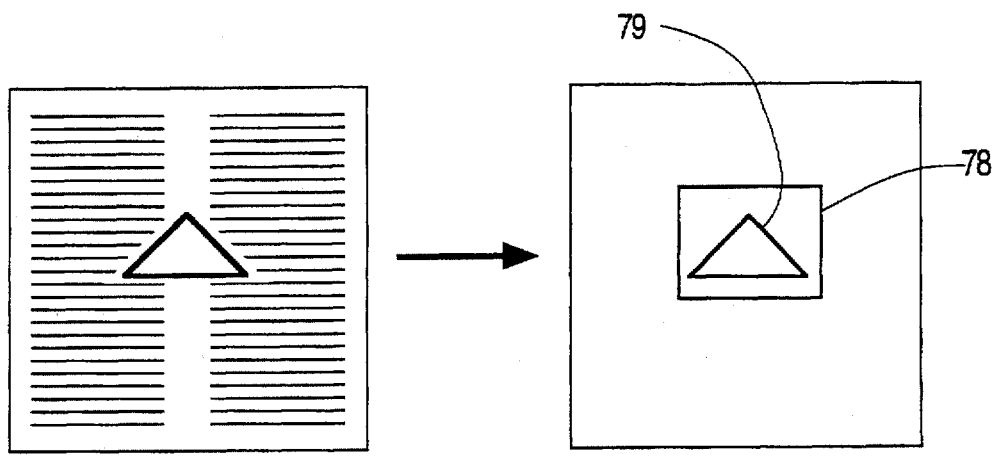
FIGS. 6A–6C are diagrams illustrating examples of frame and facet structures.

The characteristic shapes of a frame are illustrated in FIG. 6A. In this figure, the left-hand illustration depicts a compound document containing text (the root part) and a graphic part, represented by a triangle. The right-hand illustration shows the shape attributes of the frame for the graphic part.

One of the characteristic attributes of a frame is the Frame Shape. This shape is determined by the container part (the text), and describes to the embedded part (the graphic element) the geometric area that it should use to lay itself out. Referring to FIG. 6A, the Frame Shape is depicted by the outer solid border 78. The area defined by this shape might affect the scaling, line breaks, or other similar layout decisions that must be made by the editor for the embedded part. Only the container part can directly change the Frame Shape. When this shape is changed by the container part, a notification is provided to the embedded part, to enable appropriate changes to be made in the display and/or content of the embedded part.

Another characteristic attribute of a frame is the Used Shape, depicted by the inner shaded border 79 in FIG. 6A. This shape is determined by the embedded part, and describes to the container the portion of the geometric area that is actually being used by the embedded part. This shape is necessarily a subset of the Frame Shape. The container part is not allowed to draw inside the Used Shape, but is free to draw in regions outside the Used Shape, even if they are within the area of the Frame Shape 78. The embedded part can change the Used Shape, and when it does so it notifies the container part of the change.

Two other attributes of a frame are its group tag and its transformation. When a container part is unable to provide adequate space to an embedded part, the embedded part can request a new frame from the container. The frame group tag is an identifier, such as a number, which uniquely identifies a set of related frames in a given container, all of which are associated with a single embedded part. The container part uses the frame group tag to control the geometric relationship of the various frames in the group.

The frame transformation is a data structure which specifies the geometric transformation that is to be applied to all graphic commands that are used to display the embedded part within the frame. For example, if the part is to be rotated 90 degrees, all items displayed within the frame are rotated by that amount. This transformation is applied to all frames nested within the frame of interest, as well as the embedded part itself. The frame transformation is controlled by the embedded part.

Figure 6B:
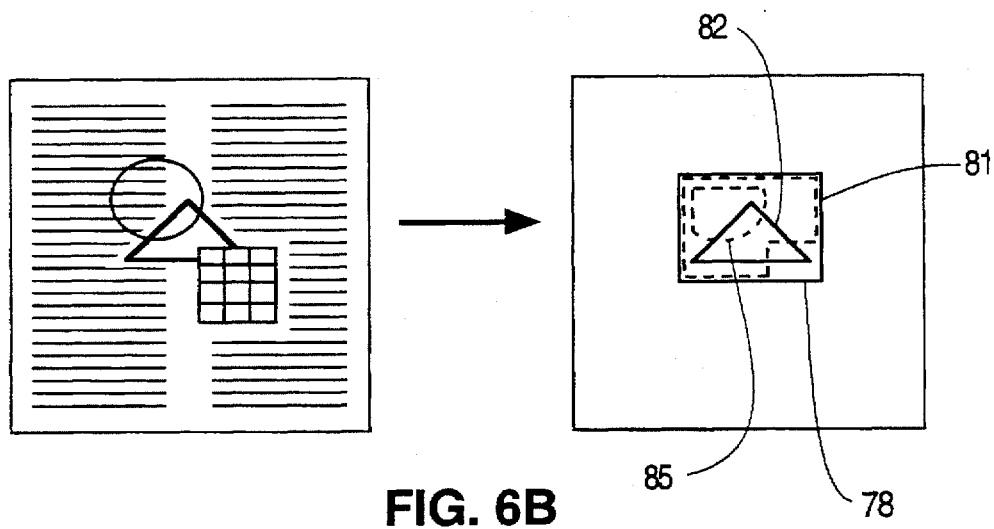
Figure 6C:
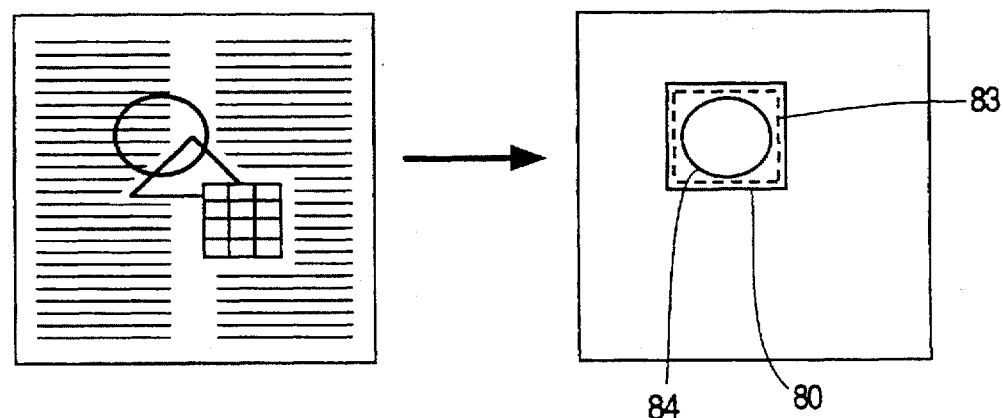

Another data structure which participates in the relationship between a container part and an embedded part is the facet of a frame. The facet represents specific placement and clipping information associated with the geometric relationship between a container and an embedded part. Like a frame, a facet also has a number of characteristic attributes. One of these is the frame with which the attribute is associated. Another group of facet attributes define various shapes. The facet shapes are illustrated in FIGS. 6B and 6C. In the example of these two figures, the root part is a text document, which contains three graphic parts, a triangle, an ellipse and a table. The right-hand illustration for FIG. 6B depicts the facet shapes for the triangle part, and the right-hand illustration for FIG. 6C depicts the facet shapes for the ellipse part. For the sake of clarity, the frame shapes 78 and 80 for these two parts, respectively, are also shown in FIGS. 6B and 6C.

One of the attributes of a facet is a Clipping Shape. The Clipping Shape describes to the embedded part the geometric area in which the contents of the part can be drawn or displayed. In the example of FIGS. 6B and 6C, the lower right-hand portion of the opaque triangular graphic part is overlaid by a table. Therefore, the Clipping Shape 81 for the triangular part excludes this area which is to be overlaid by the table. The Clipping Shape is determined by the container, i.e. the text document which forms the root part of the example illustrated in FIG. 6B. Only the container can change the Clipping Shape, and when it does so it notifies the embedded part of the change.

Another shape which is a characteristic attribute of a facet is its Active Shape, which is depicted by the lighter solid triangular shape 82 in FIG. 6B. This shape is determined by the embedded part, and is independent of the Frame Shape and Used Shape. It describes to the container part the geometric area in which the embedded part should receive geometrically related events such as cursor control input. Whenever an event occurs within this area, the user interface passes the event to the embedded part, rather than the container part. However, the container part is free to respond to events which occur in regions outside the Active Shape 82 of the embedded part.

Another characteristic attribute of a facet is the facet transformation. This data structure is controlled by the container part, and specifies a transformation which is applied to all graphic commands that are used to display the embedded part within the container part. More particularly, this transformation indicates where and how the information is displayed on the canvas of the container part. It applies to all facets nested within the facet of interest, as well as the embedded part.

In addition to these two attributes, the facet can include other shapes. One of these is a Translucent Shape. This shape is controlled by the embedded part, and describes to the container part which areas of its Clipping Shape are translucent. A translucent area is an area in which the embedded part uses drawing results of parts it obscures to complete its own display. In the example of FIGS. 6B and 6C, the ellipse is translucent, and contained within a frame whose Frame Shape 80 is co-extensive with its Clipping Shape 83 (although they are separately illustrated in FIG. 6C). This part presents a transparent wash of a desired color, e.g. blue, over anything it obscures. During display, this part employs the results previously drawn on the canvas and alters any colors drawn under it to have a more bluish tinge.

The Translucent Shape 84 for the part is shown in FIG. 6C. This shape is controlled by the embedded part, i.e. the ellipse. It is used by the display system to determine order of display and clipping information for the parts which "appear" below the embedded part in the z-axis direction, i.e. perpendicular to the plane of the display. When the embedded part changes the shape of the translucent area, it notifies the container part.

Another characteristic shape of a facet is the Overlapped Shape. This shape is controlled by the container part, and describes to the embedded part that portion of its Clipping Shape which is obscured by translucent contents of the container. The Overlapped Shape 85 for the triangle part is shown in FIG. 6B. As can be seen, it is that geometric area within the Clipping Shape 81 that coincides with the translucent shape 84 for the ellipse part. For the sake of clarity, in FIG. 6B the Overlapped Shape 85 is illustrated as being offset from the Clipping Shape 81. In practice, however, the top and left borders of the Overlapped Shape would coincide with the edges of the Clipping Shape.

The translucent contents of a container are those contents which require the results of the embedded part's display code so that the container can properly draw the translucent contents. Whenever the embedded part changes any of its contents in this area, it must notify the container part so that necessary display changes can be made.

It can be seen that frames and facets each have characteristic shapes, and other characteristic attributes, associated with them. Generally speaking, the attributes of a frame are persistent, and are saved with the file for the document. In contrast, the attributes of a facet are ephemeral, and only appear while the document is being displayed on the screen.

Figure 7A:
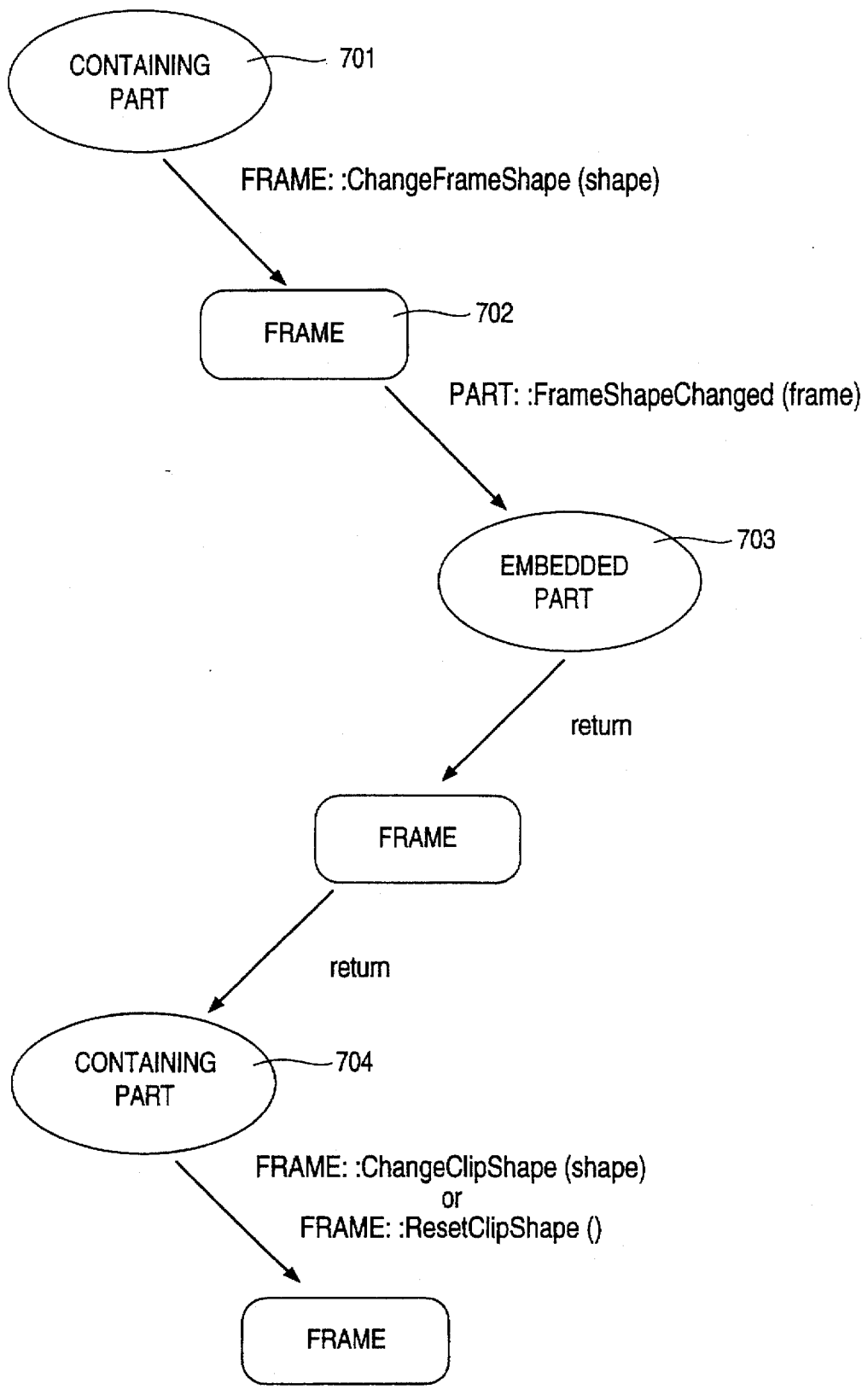
FIGS. 7A–7F are flow diagrams for examples of negotiations which take place between an embedded part and a containing part with respect to frame and facet attributes.

The frame data structure allows container parts and embedded parts to negotiate document structure with minimal knowledge of one another's internal constraints. Examples of negotiations that can take place between the containing part and the embedded part are illustrated with reference to FIGS. 7A–7F. In each of these cases shape data structures are passed between a container part and an embedded part. In all such cases, the container part is responsible for transforming its shape from the coordinate system of the embedded part to its own coordinate system. In the example of FIG. 7A, the Frame Shape is being altered by the container. This procedure may be initiated by a command from the user to change the size of the frame, for example by relocating one or more of the frame's resize handles. At Step 701, the containing part determines a new Frame Shape for the embedded frame, and notifies the frame of this new shape. The container part is responsible for transforming the shape from the container frame's coordinate space into that of the embedded frame. This new shape is stored as the Frame Shape, and the embedded part is notified of the change at Step 702. At Step 703, the embedded part adjusts itself to the new Frame Shape. For example, a text editor may reset margins for the layout of the text. If the Used and Active Shapes are different from those of the Frame Shape, the embedded part also computes these new shapes. Control is then returned to the containing part, along with notification of the new Used and Active shapes. At Step 704 the containing part changes the Clipping Shape of the frame's facet to correspond to the new Frame Shape, and notifies the facet of the new Clipping Shape.

Figure 7B:
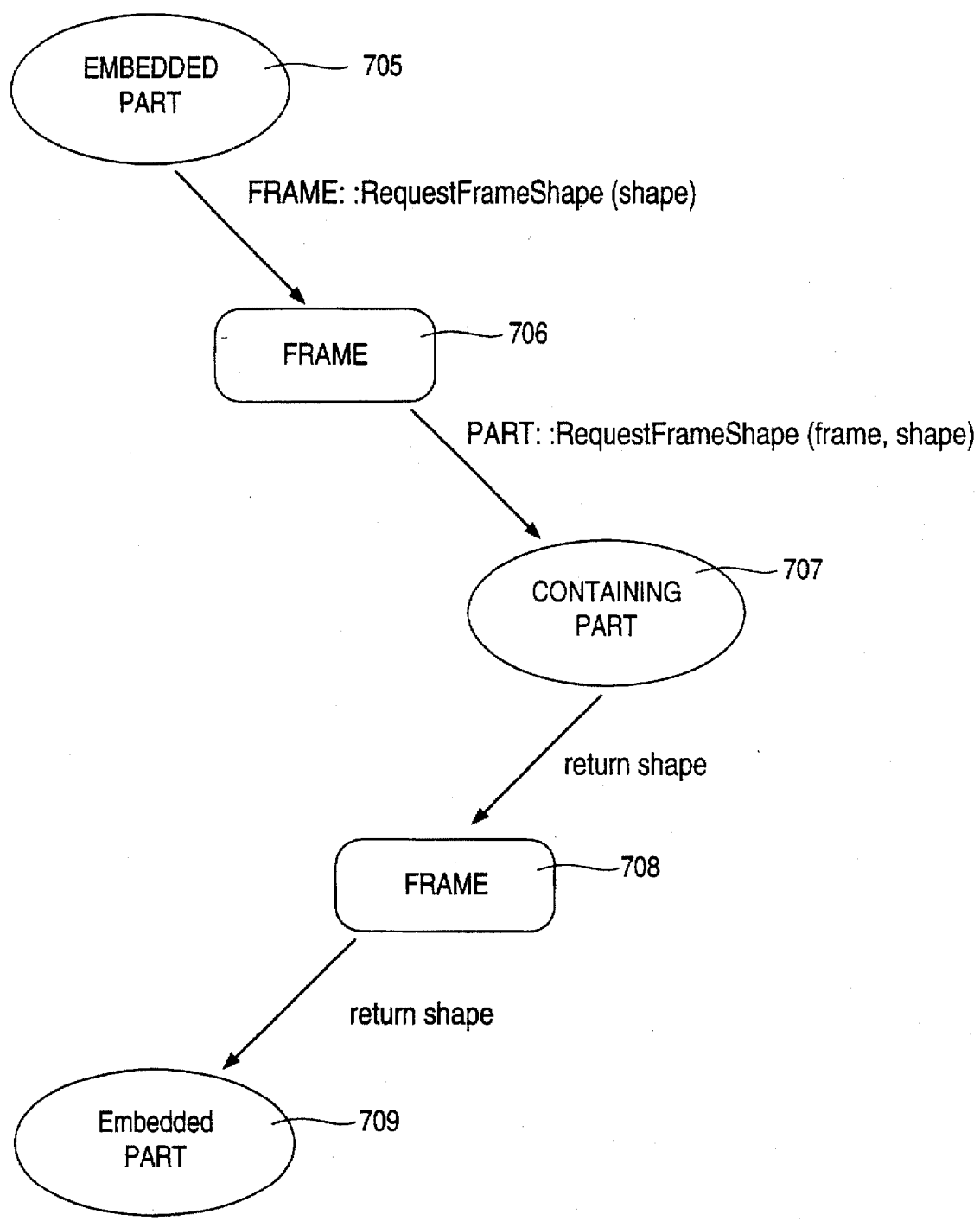

FIG. 7B illustrates the procedure that takes place when the embedded part requests a new Frame Shape. This request may be brought about as a result of an editing of the embedded part's contents, which necessitates additional space for the contents to be properly laid out. At Step 705, a determination is made that the embedded part needs a new Frame Shape, and a request is sent to its display frame for a new shape. The old shape can be stored by the embedded part, in case it will be later needed. At Step 706, the display frame passes the request on to the containing part, which transforms it into its own coordinate space. At Step 707, the containing part determines how to respond to the request. It may grant the request for the desired shape, or determine that a smaller shape is required. Once the Frame Shape is determined, the Clipping Shape for the frame's facet is also modified, and a notification is provided to the frame as to the allowed shape. At Step 708, the display frame transforms the shape from the containing frame's coordinate shape into that of the embedded frame. The new shape is stored as its Frame Shape, which is passed on to the embedded part. At Step 709, the embedded part changes the Used and Active Shapes of its facets, to adjust to its new Frame Shape.

Figure 7C:
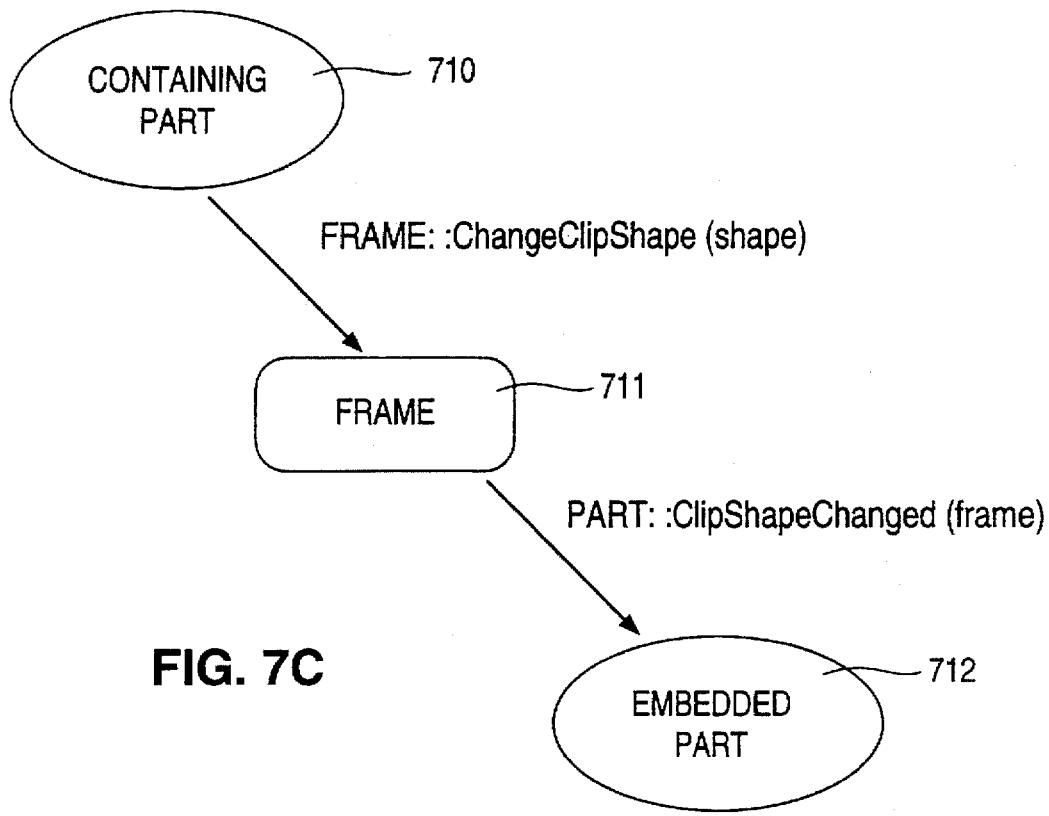

FIG. 7C depicts a procedure in which the container part changes the Clipping Shape of a facet. Referring to FIG. 6B, for example, the need to change the Clipping Shape may result from an action by the user, in which a portion of the area encompassed by the display frame is to be overlaid with the contents of a different part. At Step 710, the containing part determines a new Clipping Shape for the facet, and notifies the facet of this new shape. At Step 711, the facet passes the notification on to the embedded part. In response thereto, at Step 712, the embedded part adjusts itself to the new Clipping Shape by changing the manner in which its content is laid out, as appropriate.

Figure 7D:
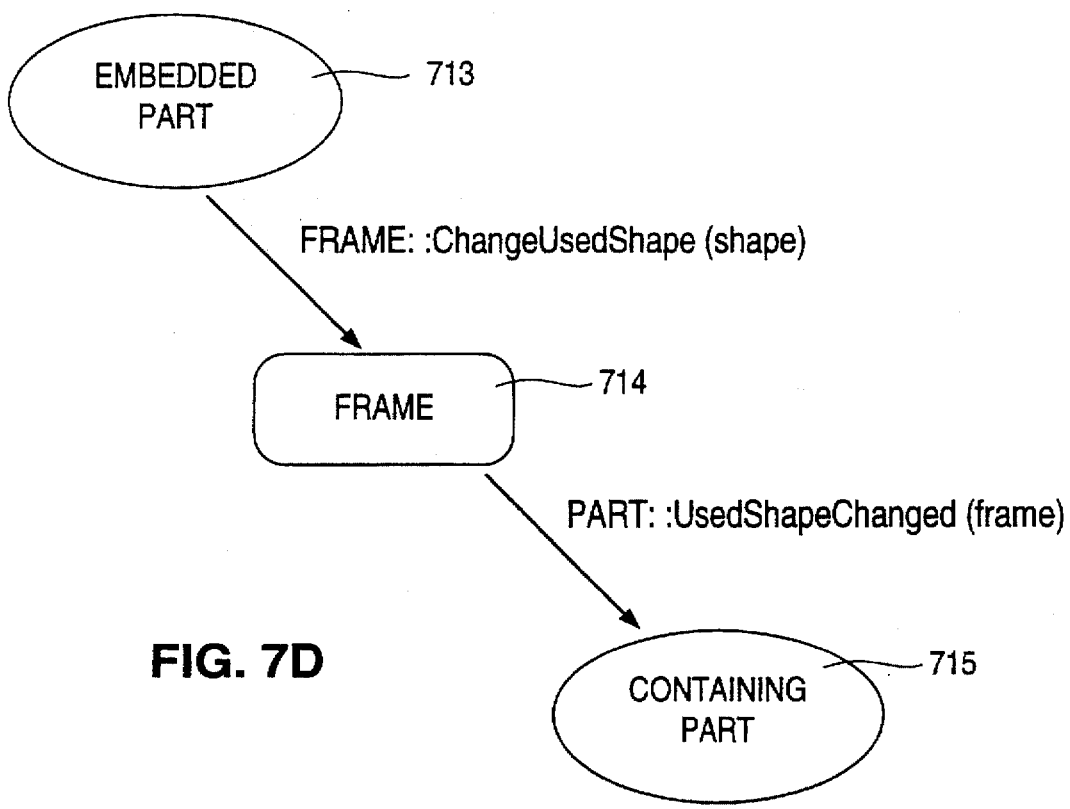

FIG. 7D depicts a procedure in which the embedded part changes its Used Shape. Again, the need for such a change may arise from an editing of the contents of the part by the user. At Step 713, the embedded part picks a new Used Shape for its display frame, and notifies the frame of this new shape. At Step 714, the display frame passes the notification on to the containing part. In response thereto, at Step 715, the containing part adjusts itself to the new Used Shape. For example, it may change the way its content is laid out to flow differently around the new shape.

Figure 7E:
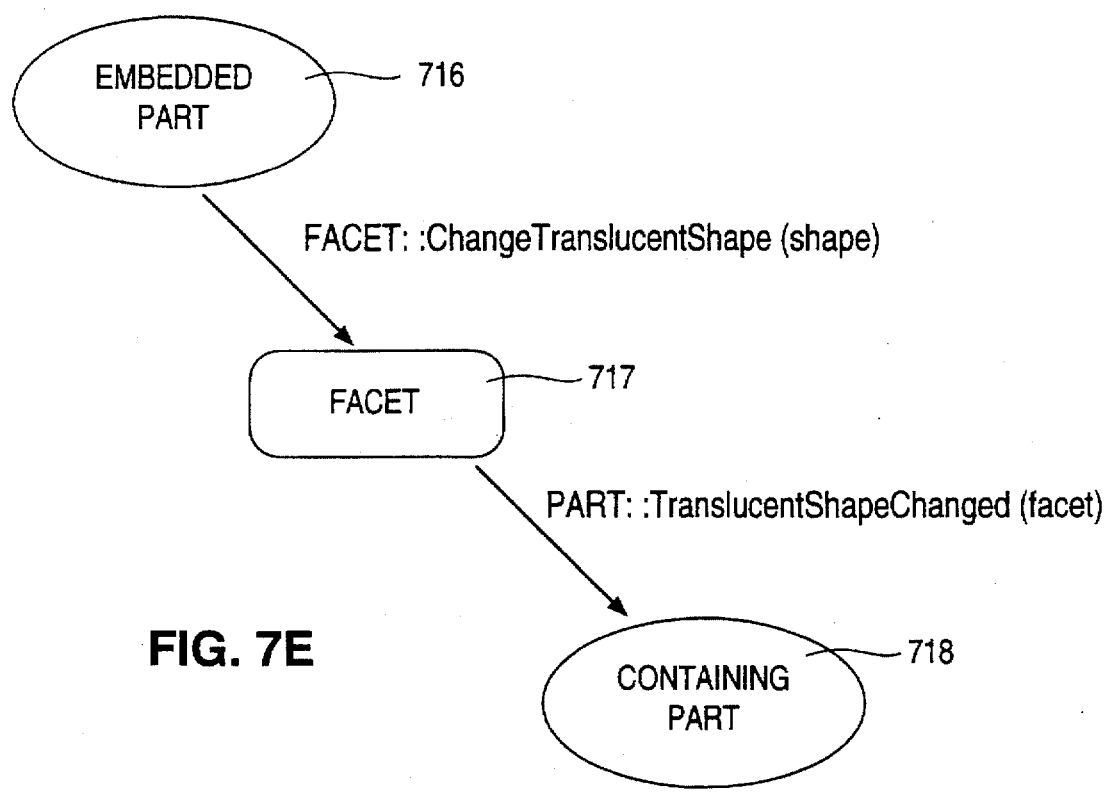

FIG. 7E depicts the procedure in which an embedded part changes its Translucent Shape. This change may result from an editing of the contents of the embedded part. At Step 716, the embedded part determines a new Translucent Shape for the facet, and notifies the facet of this new shape. At Step 717, the facet passes this notification on to the containing part. In response, at Step 718 the containing part adjusts itself to the new Translucent Shape. For example, it can change the way in which its content is laid out, or alter a display state to match the new shape.

Figure 7F:
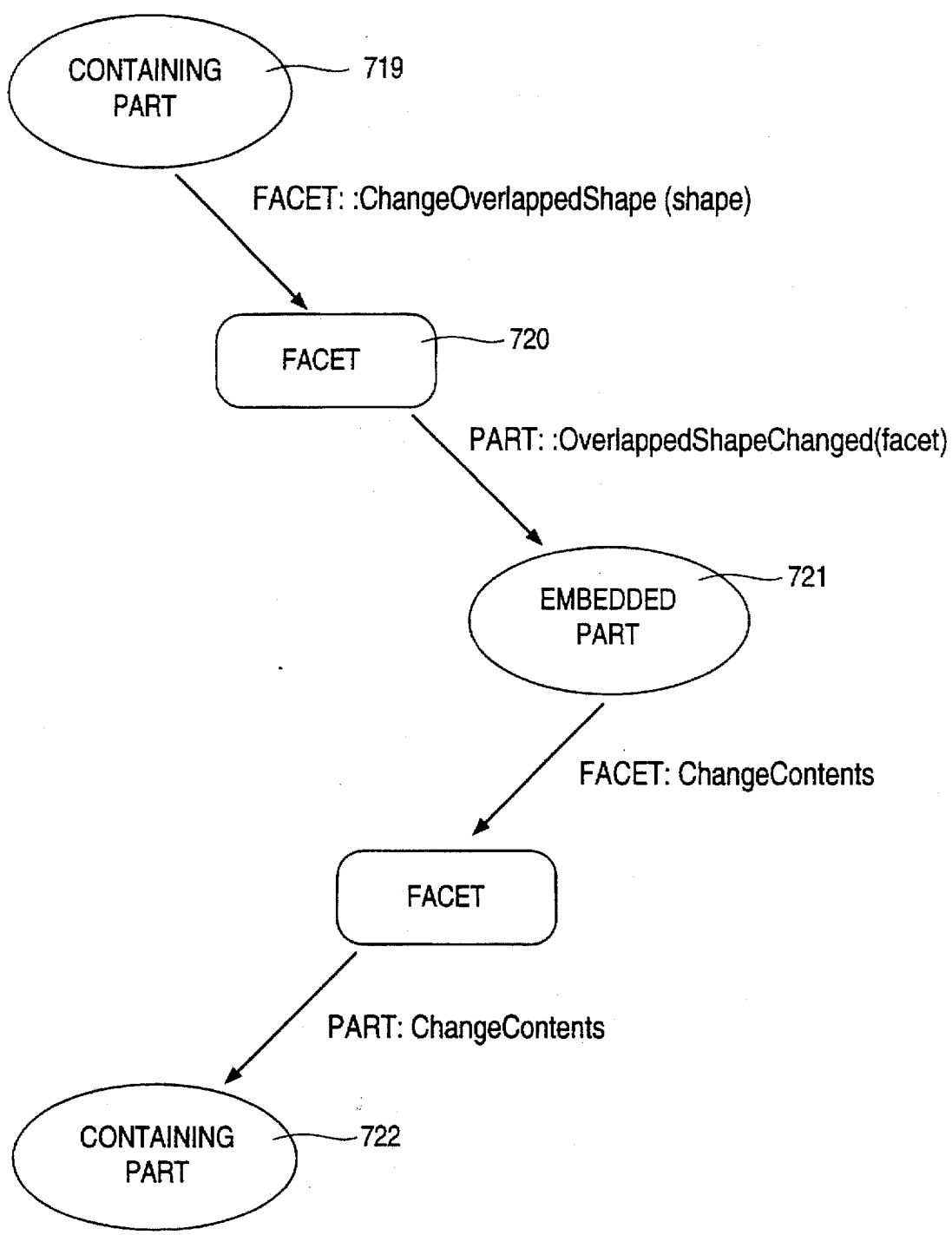

When a Translucent Shape is altered, it may be necessary to change a corresponding Overlapped Shape as well. For example, if the shape of the translucent ellipse in the illustration of FIGS. 6B and 6C is changed, the Overlapped Shape 85 will also have to be changed. Referring to FIG. 7F, at Step 719 the containing part selects a new Overlapped Shape for the facet, and notifies the facet of this shape. At Step 720, the facet passes this new shape on to the embedded part. In response thereto, at Step 721 the embedded part adjusts its display to accommodate the new shape. In return, the embedded part informs the containing part of the contents of its new overlapped shape, so the containing part can adjust its display, e.g. bluish tinge, at Step 722. Generally speaking, whenever the contents of the Overlapped Shape change, due to either a change of the shape itself or an editing of the contents, the embedded part must inform the containing part of this change, so that the display can be adjusted appropriately.

The frame and facet, therefore, are data structures which enable the required space allocation between an embedded part and a containing part to be readily negotiated. Through the use of various shapes and other attributes, the frame and facet enable the containing part and the embedded part to utilize the available space in an efficient manner for display of its contents, without requiring each part to have detailed information as to the contents or behavior of the other part. Thus, compound documents can be assembled with a great degree of flexibility.

The editor, or other manipulator, for a part is analogous to an application program in a conventional computer system. It is a software component which provides the necessary functionality to display a part's contents and, where appropriate, present a user interface for modifying those contents. It may include menus, controls, tool palettes and other interaction techniques. For a part which is capable of containing other parts, its editor takes these contained parts into consideration when displaying its content. For example, a text editor may wrap its part's contents so that it does not appear in the Used Shape of an embedded graphic part.

In order to use the functions provided by a conventional application, the program must be launched or booted. In other words, it must be stored in the system's active memory, e.g. the RAM 16. In a similar manner, the editor for a part must be running in the system's memory or otherwise accessible to the CPU. To do so, the editor must be installed on the system. For example, it can be stored in a folder on a hard disk 20, and called when an associated part is accessed. To conserve system resources, all installed editors may not be loaded into the system memory at all times. Rather, they can be launched as needed. For example, an editor for a part can be launched when the part is dragged into a document, since this is the time that the editing capabilities are most likely to be needed.

Figure 8:
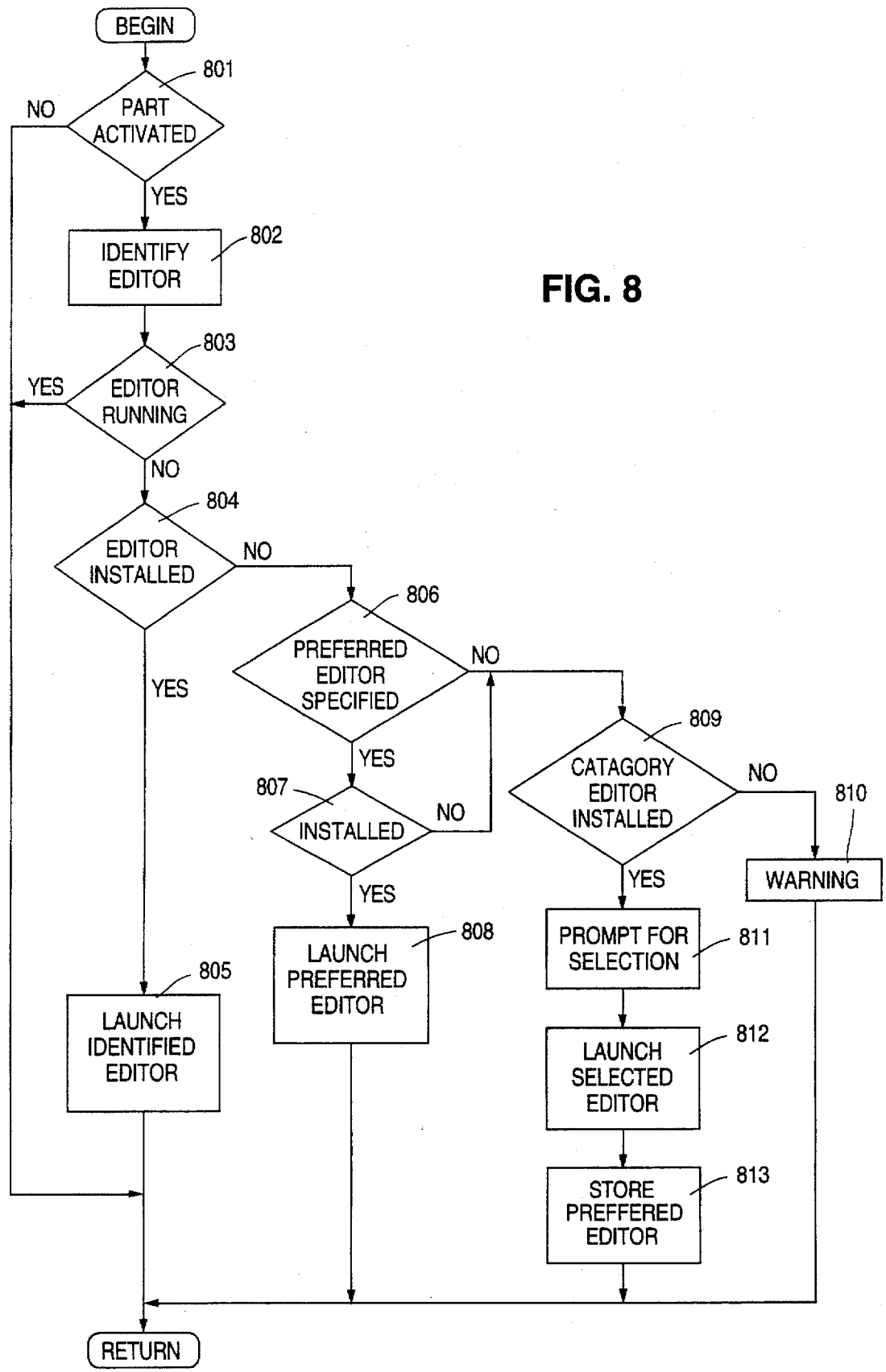
FIG. 8 is a flow chart of the process for launching an editor.

The process for launching an editor, or other manipulator, is depicted in the flowchart of FIG. 8. Referring thereto, at Step 801 the system looks for a part to be activated. The accessing of this step may be in response to an event flag that is generated whenever the mouse button is depressed, or it could be a step in a script. Once the activation of a part is detected, the system identifies the editor associated with that part (Step 802). In this regard, every part has certain properties associated with it. One of these is a pointer which points to the editor for that part. Two other properties are the part's category, e.g. whether it is text, graphic, spreadsheet, etc., and its type, which is an indicator of the format for the part's contents. For example, one text part could be of the "Word Processor A" type, and another's type could be "Word Processor B", although both belong to the same category (text). Often, a part's type will be determined by the last editor used on the part's contents. Generally speaking, a category is a set of part types, and determines the set of part editors or viewers that are applicable to a given part. The properties of a part are stored along with its contents. For example, all of a part's properties can be contained in a "property sheet" that is stored with the part's contents.

Once the editor (or part type) has been identified at Step 802, the system determines whether that editor is already running in memory (Step 803). If so, the system returns to the main routine and awaits further user action. If the editor is not already running, the system checks whether the editor identified in Step 802 is installed on the system (Step 804). If the editor identified at Step 802 is installed on the system, that editor is launched at Step 805, so that it can be used to edit the part's contents.

It may be the case, however, that the part's editor is not currently installed on the system. In this case, the decision at Step 804 would be negative, and in response thereto the system determines whether the user has selected a preferred editor for that category of part (Step 806). More particularly, a user can select a preferred, or default, editor for each different category of part. Thus, if the user is most familiar with the function commands of a particular word processor, that processor can be selected as the preferred text editor for all parts in the text category. If a preferred editor has been selected, the system checks whether the preferred editor is installed (Step 807), and if so it is launched at Step 808.

If no preferred editor has been specified, or if the preferred editor does not exist on the system, a check is made at Step 809 whether any editor for that category of part is present on the system. If not, an appropriate warning is provided to the user (Step 810), and the system then returns to the background routine. If one or more editors for that category of part is available, they are listed and the user is prompted to select one (Step 811). In response to a selection by the user, the selected editor is launched (Step 812) and it is stored as the preferred editor for that category of part (Step 813). The system then returns to the background routine to await further user input.

The user can be provided with the option of changing the designated editor for a part at any time, for example through an appropriate menu command. By invoking this command, the user causes the pointer that is stored as one of the part's properties to be changed to the location of a different editor installed on the system. Menu commands can also be provided to enable the user to select preferred editors at different levels, for example at the document level (all text parts in a document have the same editor) and at a global (system-wide) level. Whenever the user accesses the menu to select or change an editor for a part, only the set of installed editors which are appropriate for that category of part are displayed to the user for selection.

If desired, the system can keep a record of the last time that each editor running in memory has been used. If an editor has not been used for a predetermined length of time, the system can automatically delete the editor from memory, to thereby conserve system resources. Also, when a document is closed, the editors associated with the document's parts can also be closed, unless they also pertain to other parts which are currently open, for example in another document.

Because of the autonomous nature of parts, the containers for various parts are no longer limited to specific types. For example, in the past a text document could only contain graphics or other content which was in specific data formats. Limitations of this type are removed with the architecture of the present invention. Basically, any part appears as a "black box" to any other part. A containing part need not have any information about the internal structure or semantics of other parts contained within it. The containing part merely functions as a wrapper for the other parts contained in it. This type of architecture greatly facilitates the compilation and editing of compound documents.

Figure 9A:
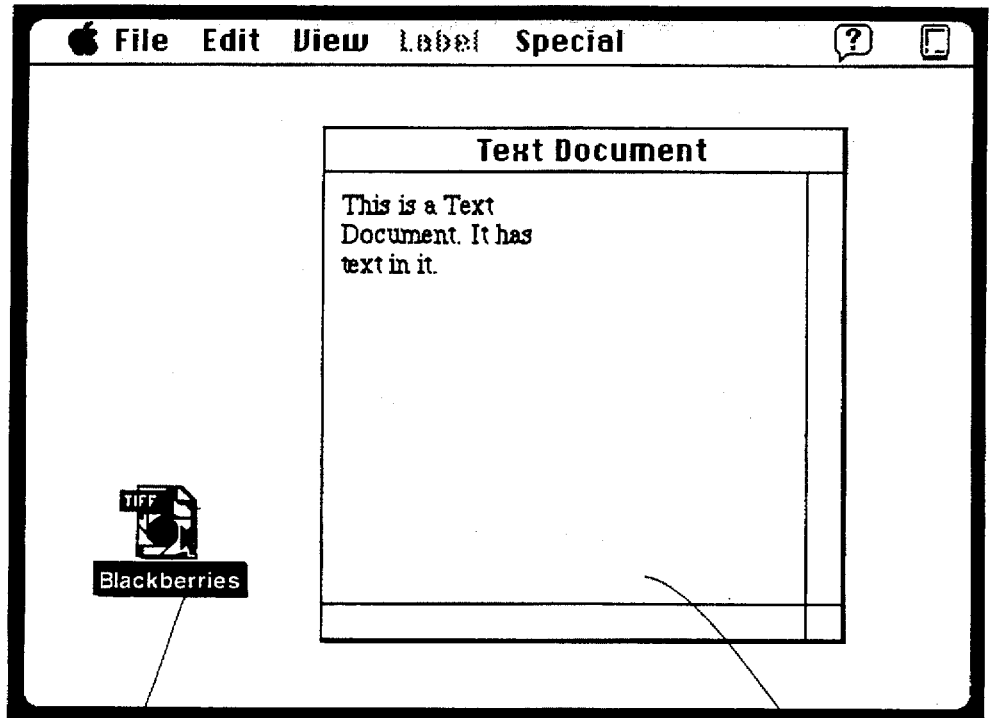
FIGS. 9A–9E are a sequence of screen displays illustrating the dragging of a part between a desktop and a document.

To further illustrate, a document can be represented by an icon which is located on the desktop itself. Referring to FIG. 9A, the illustrated desktop includes a window 89 containing a text document. Also located on the desktop is an icon 90 for a graphic document. Each of the window and the icon represents a respective part. In the case of the text document located within the window, the part is represented in the form of a frame, whose borders are contiguous with that of the window itself. In accordance with the present invention, the part represented by the icon can be directly manipulated by the user and placed within the text document, without the need for intervening dialogue boxes or the like. This operation is described hereinafter with reference to the illustrations of FIGS. 9A–9E and the flowchart of FIGS. 10A and 10B.

To place the graphical document represented by the icon 90 into the body of the text document within the window 89, the user first positions the mouse pointer over the icon (Step 1001) and depresses the mouse button to select the icon (Step 1002). In response thereto, the system highlights the display of the icon, to indicate the fact that it is selected (Step 1003). In the example of FIG. 9A, the highlighting of the icon 90 is indicated by the reverse video representation of the icon's picture and its title.

Figure 9B:
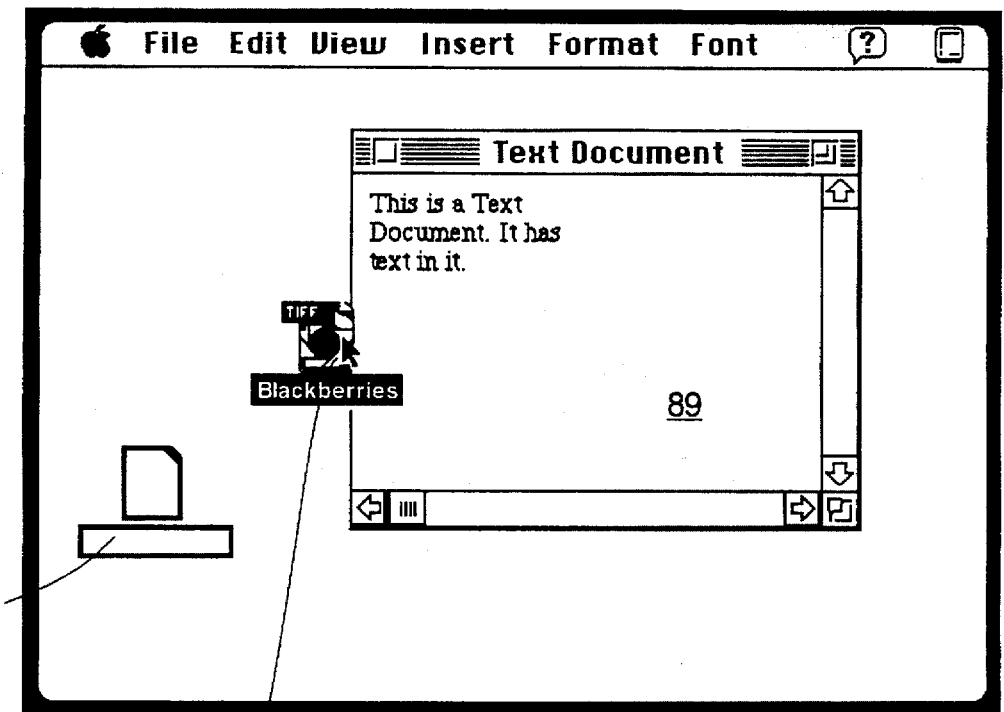
Figure 10A:
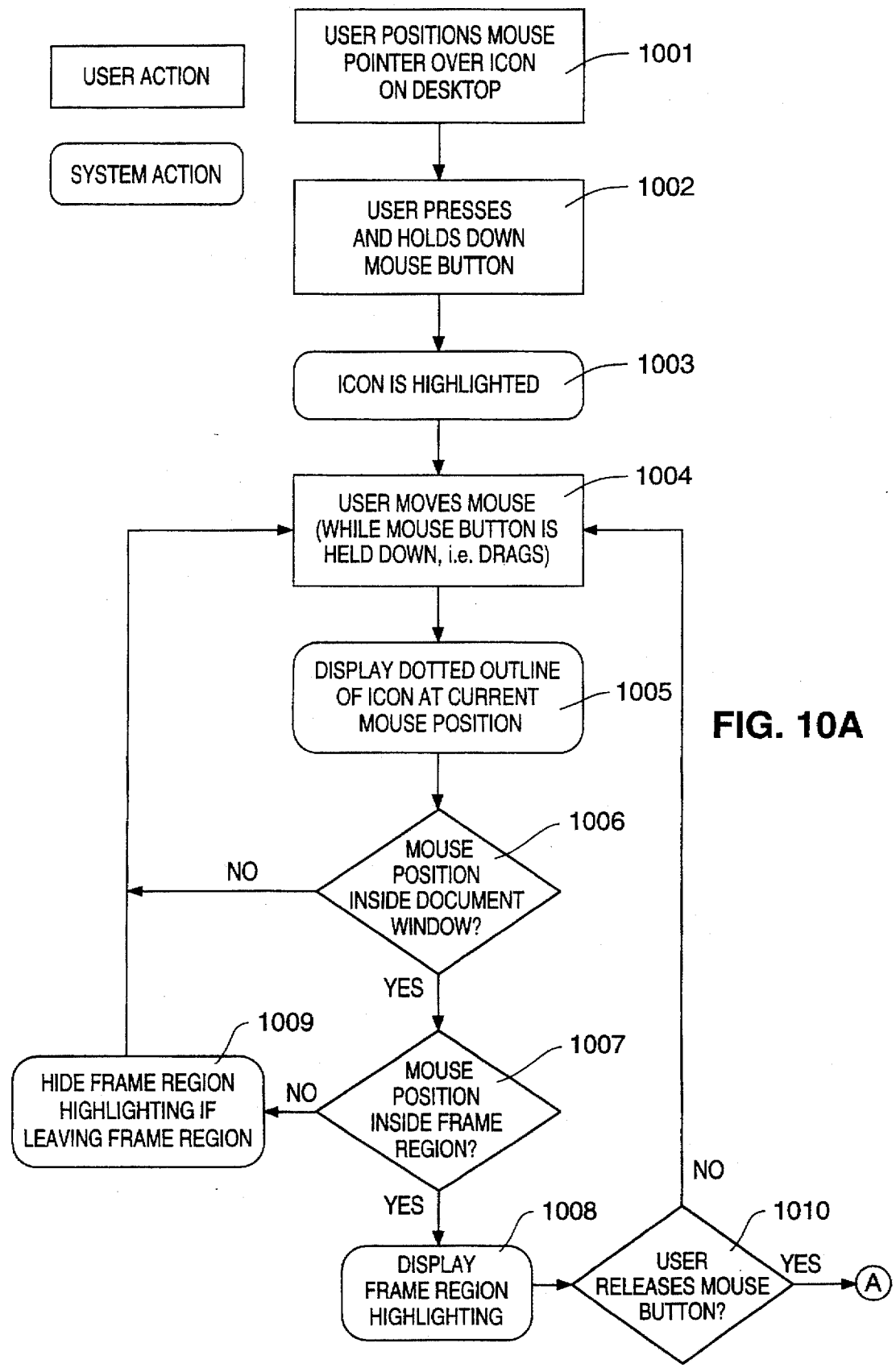
FIGS. 10A and 10B are a flow chart for the process of dragging and dropping a part.
Figure 10B:
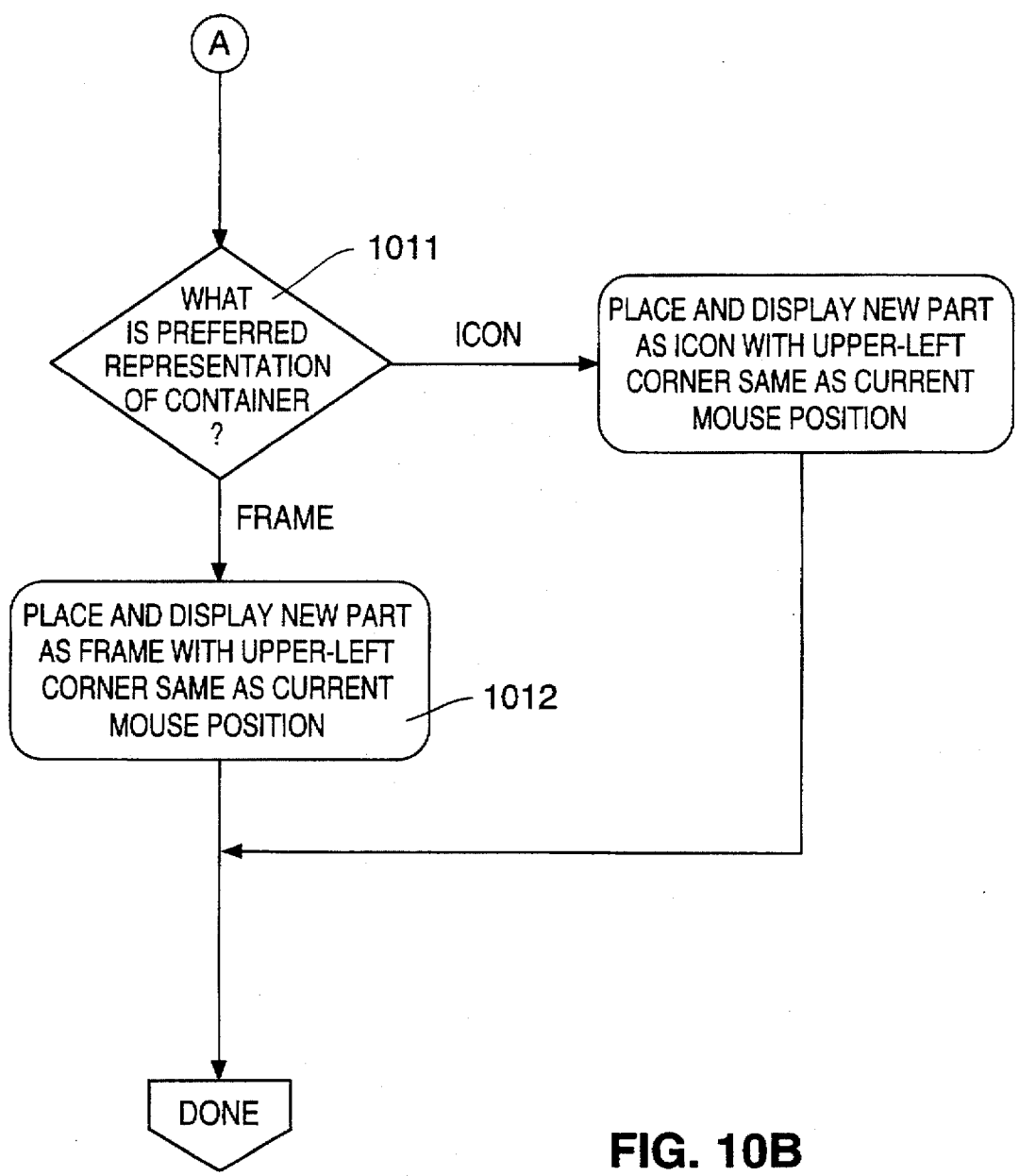

While holding the mouse button down, the user moves the cursor to the desired location for the graphic part (Step 1004). As illustrated in FIG. 9B, the selected icon follows the movement of the cursor. The movement of the icon with the cursor is known as a "drag" operation. While the icon is being dragged to the desired location, a ghost outline 91 of the icon remains on the desktop, to indicate its original position. Alternatively, the ghost outline can move with the cursor, and the full icon representation remain in the original position, as depicted in Step 1005.

During the dragging of the icon, the system determines whether the cursor enters a window (Step 1006). As the icon 90 is positioned inside the window 89, the window itself becomes highlighted. If the system detects that the dragged icon enters a frame within the window (Step 1007), the frame is appropriately highlighted, to indicate that it can receive the dragged object (Step 1008). If the icon continues to be dragged so that it goes back outside of the frame, the highlighting on the frame is removed (Step 1009). Conversely, if plural frames are nested inside one another, each successively nested frame becomes the active one as the icon is dragged inside it. In this manner, the system provides feedback regarding the frame that will be active and the location at which the icon will be dropped if the cursor control button is released.

Figure 9C:
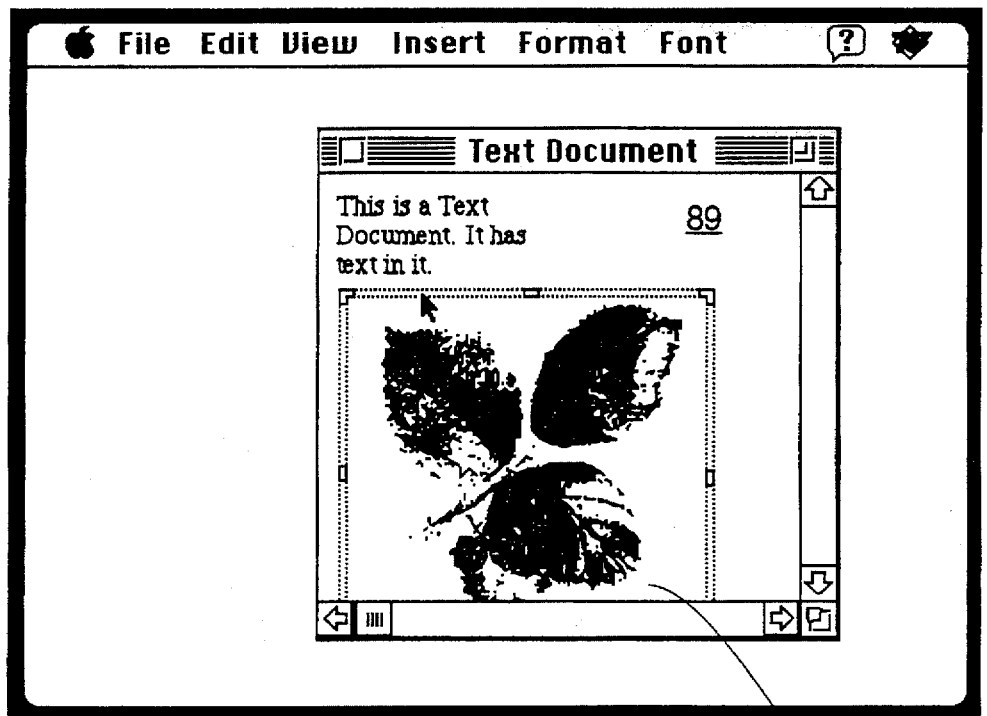

Once the dragged icon is at the desired location, the user releases the mouse button (Step 1010). At this point, the system determines the preferred representation for the part, i.e. whether it should appear as an icon or as a frame (Step 1011). In the example of FIGS. 9A–9E, since the part has been placed in a document, its preferred representation is as a frame. Accordingly, as shown in FIG. 9C, the graphic part is displayed as a frame 96, with its upper left corner corresponding to the position of the cursor when the mouse button was released (Step 1012). As also shown in FIG. 9C, the frame is illustrated with a thicker border and resize handles, to indicate the fact that it is the selected part.

Figure 9D:
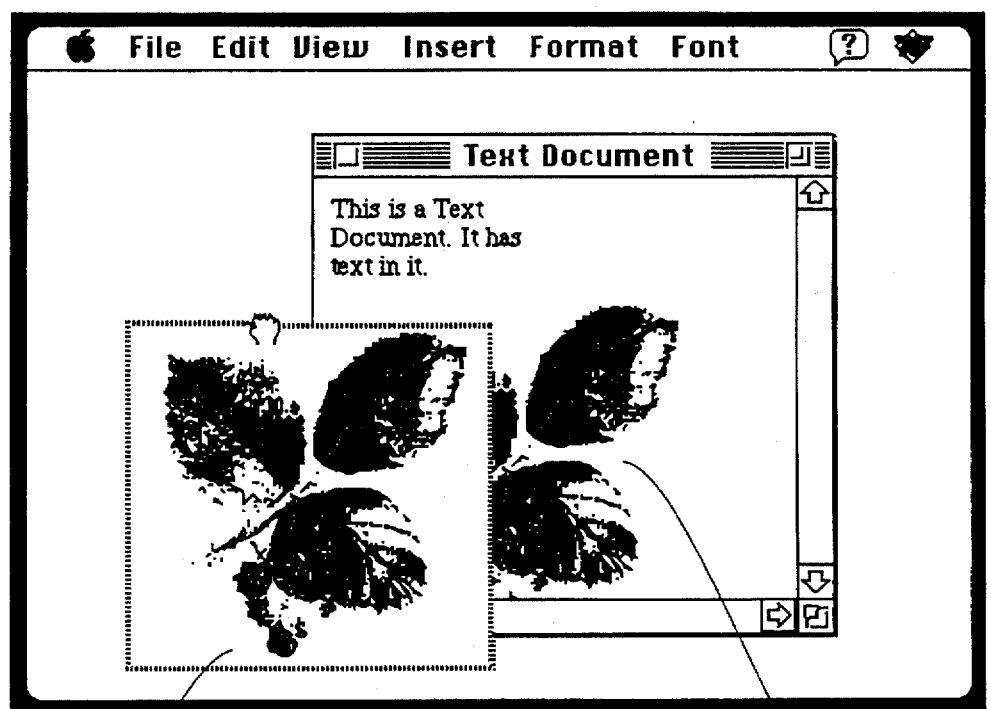
Figure 9E:
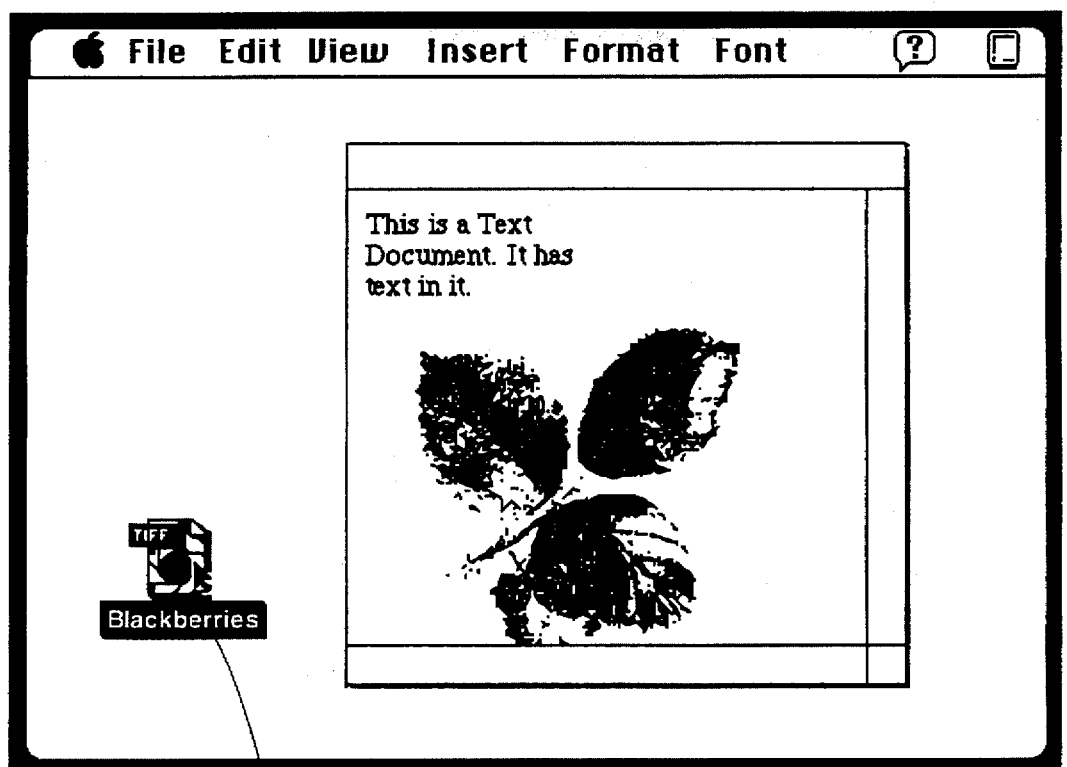

The reverse operation can be performed to move the part from the document back onto the desktop. Furthermore, it is possible to copy the part, so that its contents remain within the document while another representation of the part is placed on the desktop. To do so, the user depresses a function key, such as a control or option key on the keyboard, while dragging the frame. The simultaneous depression of the function key along with the actuation of the mouse button provides an indication to the system that a copy operation is to be performed. Then, while continuing to hold the mouse button down, the user drags the frame to the desktop, as illustrated in FIG. 9D. Note that the contents 98 of the graphical part remain within the text document, and a second copy of the part appears in the frame 96. Once the frame is moved to the desired location on the desktop, the mouse button is released, and the system again determines the preferred representation for the part. In this case, since the part is located on the desktop, the preferred representation is as an icon. Thus, an icon representation 90 of the part is displayed on the desktop, as shown in FIG. 9E.

Alternatively, if a copy operation is to take precedence over a move, the copy can be made by dragging a part without depressing a control key, and the move operation can be implemented when the control key is depressed at the time a part is selected and dragged.

Since the part is directly manipulated between the desktop and the document in the system of the present invention, the metaphor of the desktop is better preserved. In other words, the user picks up a desired part from the desktop and places it directly in the document, without any intervening operation such as filling out dialogue boxes or the like. As a result, the amount of time and number of steps that are required to introduce new content into a document is reduced.

Further details regarding one manner in which the system can implement the dragging and dropping of objects between a desktop and a document are described in application Ser. No. 08/025,989, filed on Mar. 3, 1993 by Robert G. Johnston, Jr., Mark L. Stern and David L. Evans, entitled "Method and Apparatus For Improved Manipulation of Data Between an Application Program and the File System on a Computer Controlled Display System", U.S. Pat. No. 5,598, 524 the disclosure of which is incorporated herein by reference.

As described above, each part has a property which is referred to as its preferred representation. This property determines whether parts contained inside a given part are normally displayed as icons or as frames, in order to obtain a behavior which is traditionally associated with both folder and document windows. Generally speaking, all parts are classified as either a desktop part or a document part. A desktop part is one whose purpose is to contain or operate on other parts, such as a folder, printer or mailbox. The preferred representation for a part contained in a desktop part is as an icon. A document part is a part whose purpose is ultimately to be printed on paper or other hard copy, such as a text document or a graphics document. The preferred representation for a part that is contained in a document part is as a frame. Thus, referring to the operation depicted in FIGS. 9A–9C, the graphic part is illustrated as an icon when it is present on the desktop (FIG. 9A), but is changed to a frame representation when it is placed within the document (FIG. 9C). Similarly, when the part is moved from a document to the desktop, its representation changes from a frame to an icon (FIGS. 9C–9E). Of course, the user can be provided with the option to change the representation of any part, for example through a keyboard or menu command.

As described previously, a stationery part is different in the sense that it is only represented as an icon. It can be moved from one desktop part to another. Thus, for example, it can be treated like an ordinary part in a folder. However, when an attempt is made to move a stationery icon into a document part, a copy of the stationery part is placed in the document part instead, and that copy appears as a frame.

In addition to moving parts as a whole, the user can select and move some or all of the contents of a part. Every part has its own intrinsic type of contents. For example, text parts contain text characters, graphic parts contain graphic elements, etc. The user can select some of the intrinsic contents of one part, the donor part, and move or copy them into a different part, the destination part. There are three possible scenarios in which this type of operation can occur: (1) the donor and destination parts both contain the same intrinsic type of data, (2) the donor and destination parts contain different types of data, but the destination part can accommodate the category of data being received from the donor part, and (3) the donor and destination parts are of different data types, and the destination part is not adapted to accommodate the category of material received from the donor part. Each of these three cases is discussed below, with reference to illustrated examples.

Figure 11A:
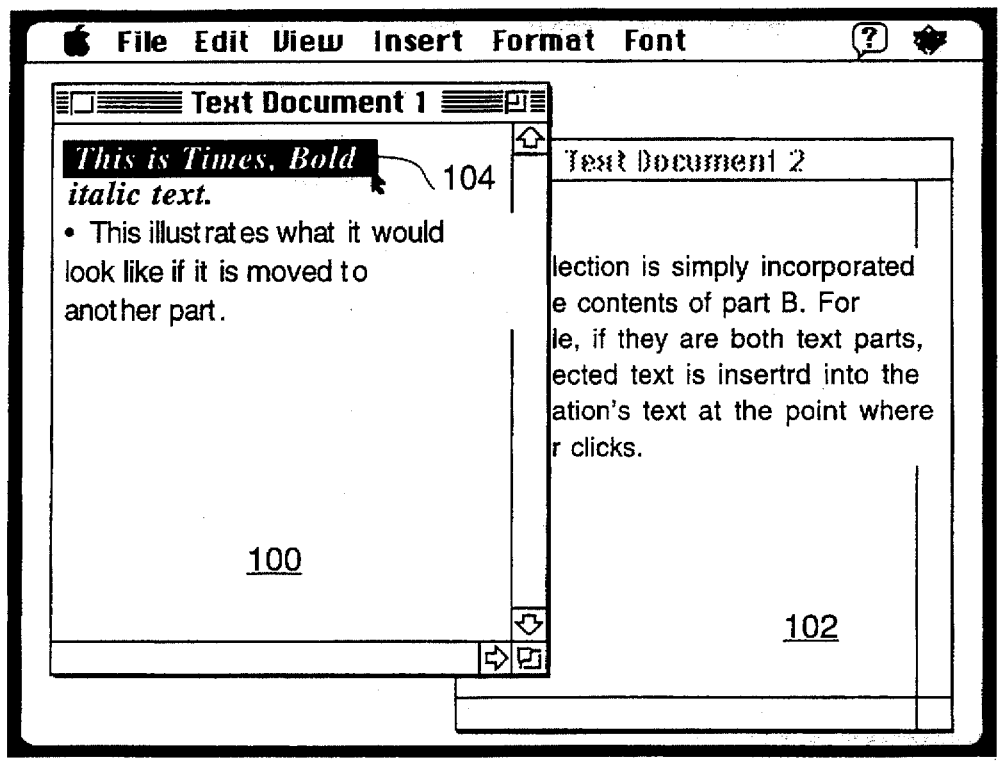
FIGS. 11A–11C, 12A–12C and 13A–13C are respective sequences of screen displays illustrating the copying of material from one part into another part.
Figure 11B:
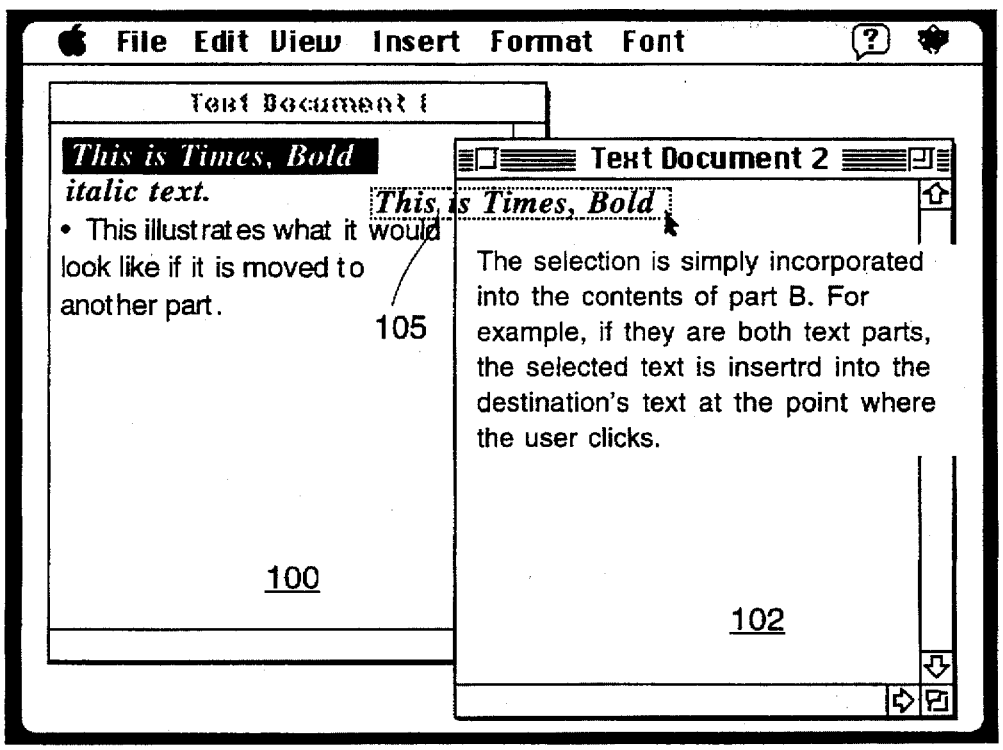

In the first scenario, the donor and destination parts are the same type of part. For example, their intrinsic content may be text characters, and they may have been created with the same word processor. FIG. 11A illustrates an example in which two text documents 100 and 102 are respectively located within two windows on a desktop. A portion 104 of the text in the left-hand document 100 has been selected, as indicated by the reverse video display. This selected text is to be copied into the document 102 in the right-hand window. Thus, the user depresses the mouse button, along with a function key, if required, and drags the copy 105 of the selected text 104 into the right-hand document 102, as shown in FIG. 11B. Once the cursor enters the second document 102, this document becomes highlighted. Since the left-hand document 100 is now inactive, it is placed behind the document 102, and its title bar is no longer highlighted.

Figure 11C:
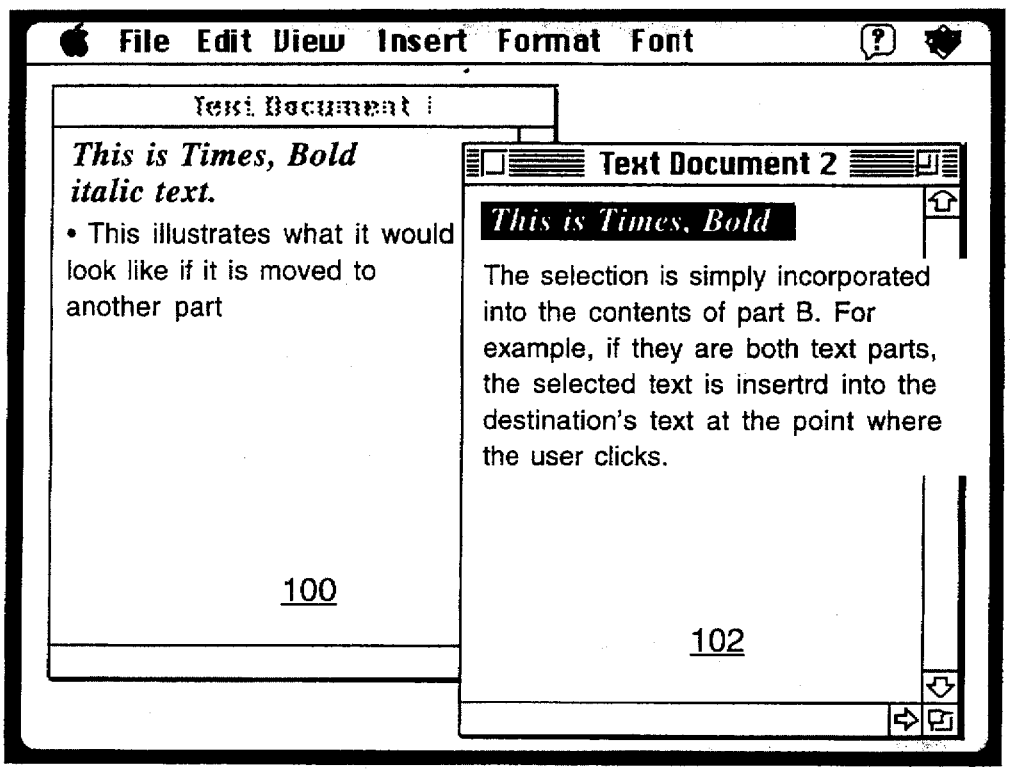

Once the copied text is in the desired location, the user releases the mouse button to place the text in the document, as illustrated in FIG. 11C. Since the text that was copied from the first document to the second document is of the same type as the intrinsic contents of the second document, that text is incorporated into the contents of the second document. In other words, once the selected text is placed in the second document, it no longer has a separate identity of its own. Rather, it becomes a part of the intrinsic contents of the destination document. Thus, it can be edited with the same editor that is used for the original contents of the destination document.

Figure 12A:
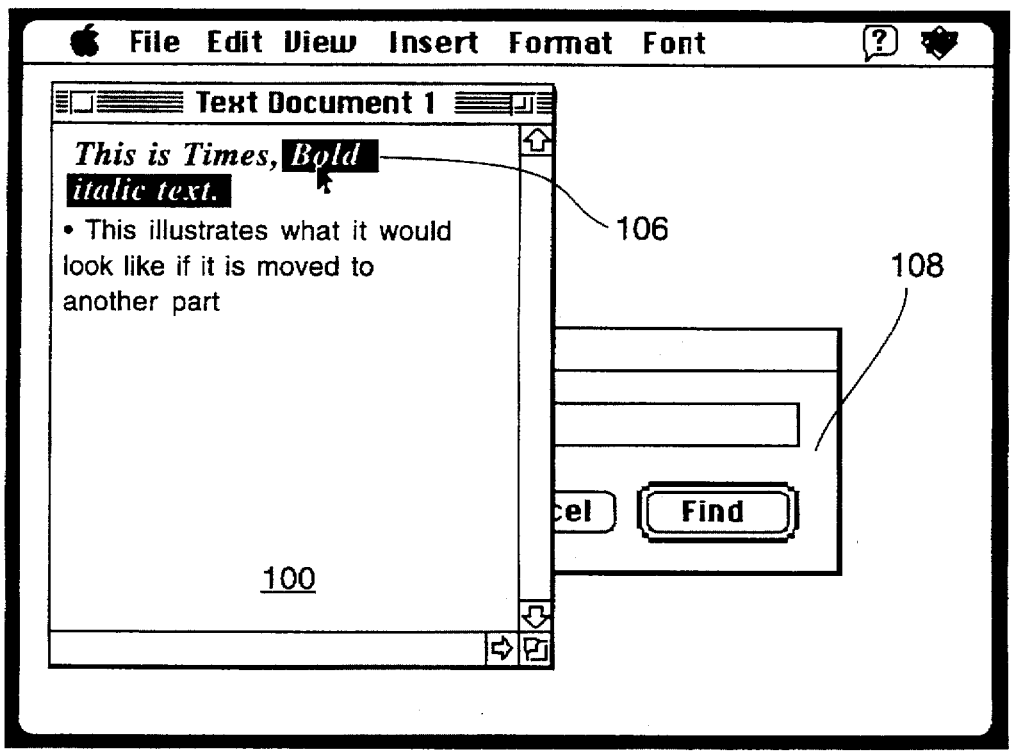

In the second scenario described above, the intrinsic contents of the donor and destination parts are of different types, but the destination part can handle the category of information contained in the donor part. Referring to FIG. 12A, selected text 106 from a document 100 created with a full capability text editor is to be copied into a dialogue box 108. In this example, the selected text 106 is stylized, i.e. it has a bold attribute and is in an italicized font. The dialogue box, however, is only adapted to handle plain text.

Figure 12B:
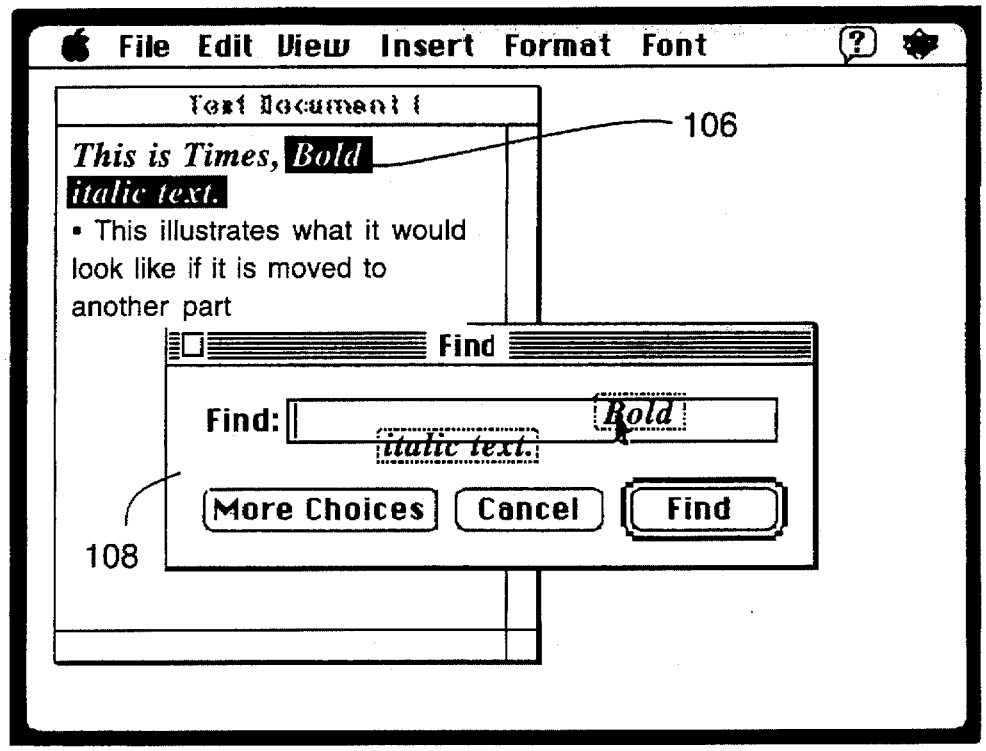
Figure 12C:
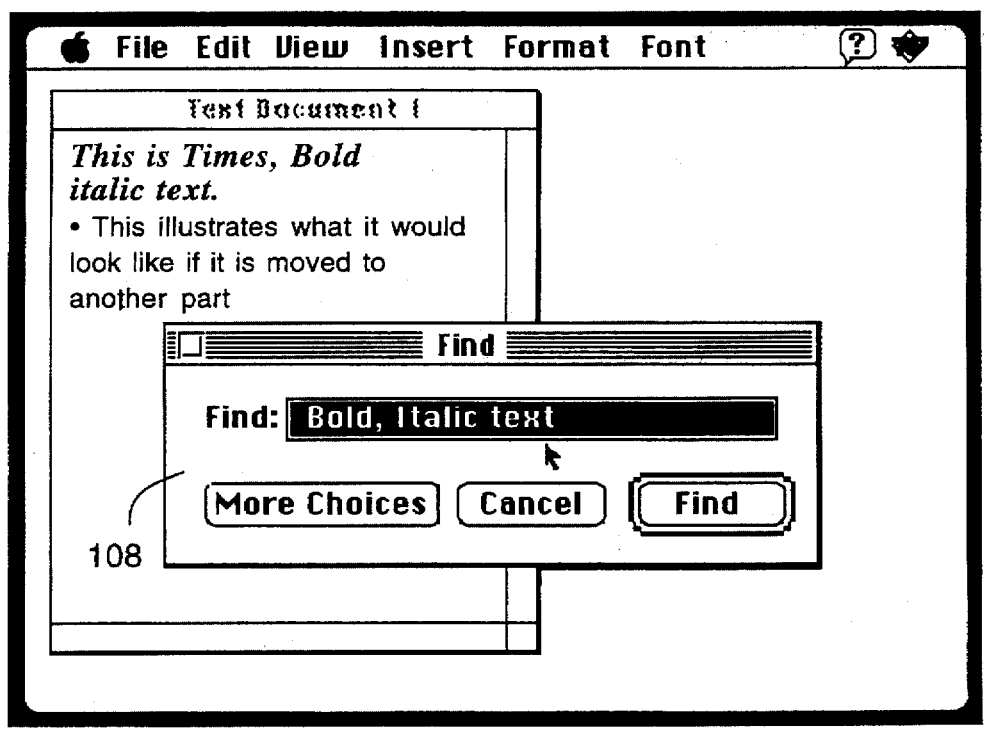

In a manner similar to the previous example, a copy of the selected text 106 is dragged from the text document to the dialogue box. As the cursor enters the dialogue box 108, it moves to the forefront of the display, as illustrated in FIG. 12B. Once the copy of the selected text is located in the appropriate portion of the dialogue box, the user releases the mouse button to "drop" it in place. At this point, the system determines that the dropped text is not of the same type as the intrinsic contents of the dialogue box, i.e. it is stylized rather than plain. However, it belongs to a compatible category, in that it is text. Accordingly, the system converts the stylized text into plain text by removing its style properties, and then incorporates it into the dialogue box as part of its intrinsic contents, as shown in FIG. 12C. Note also that the copied text, which was wrapped over two lines in the original document 100, has been rewrapped onto a single line in a dialogue box 108 as part of the conversion process, for example by removing a carriage return in the copy of the selected text.

Figure 13A:
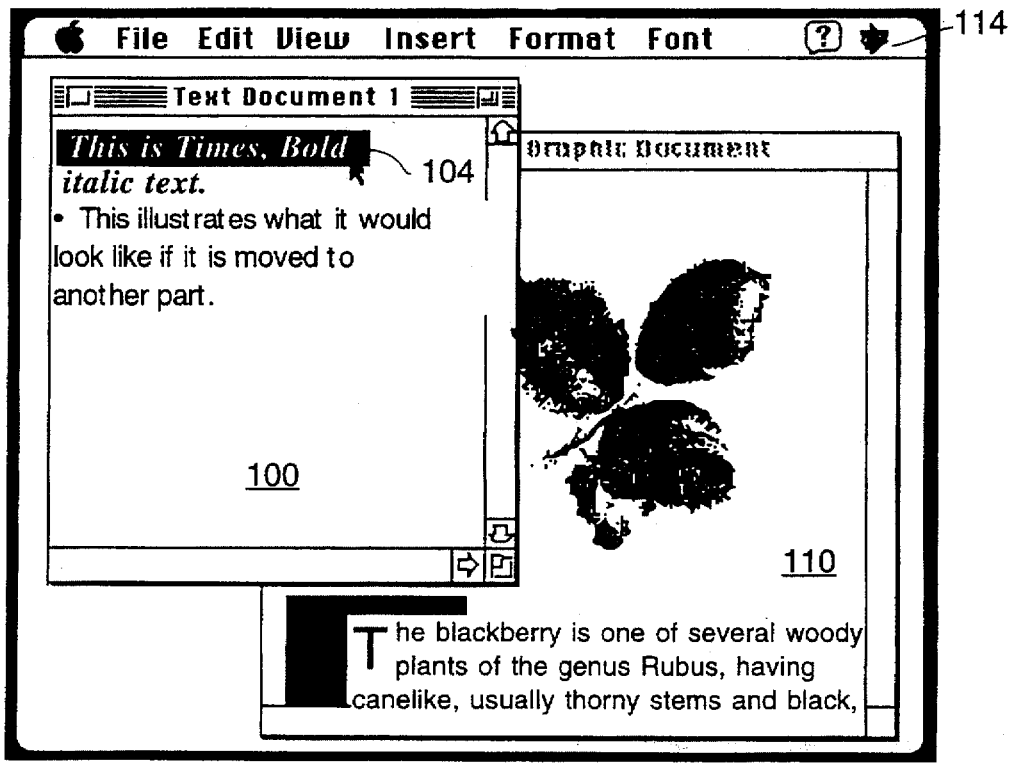
Figure 13B:
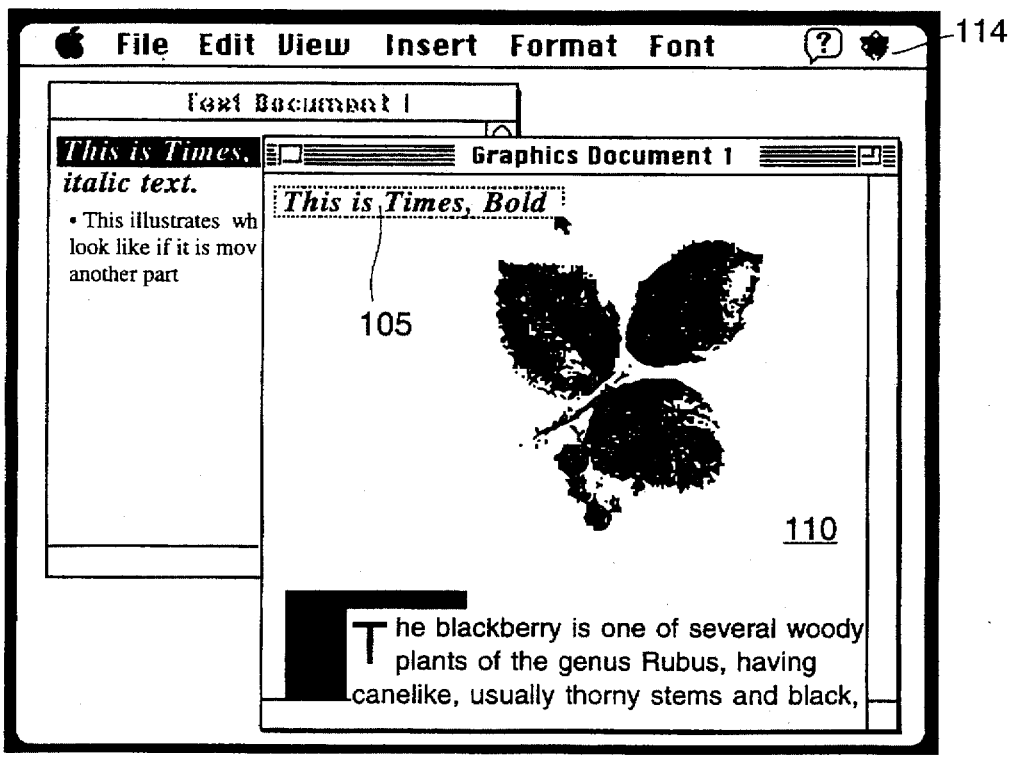
Figure 13C:
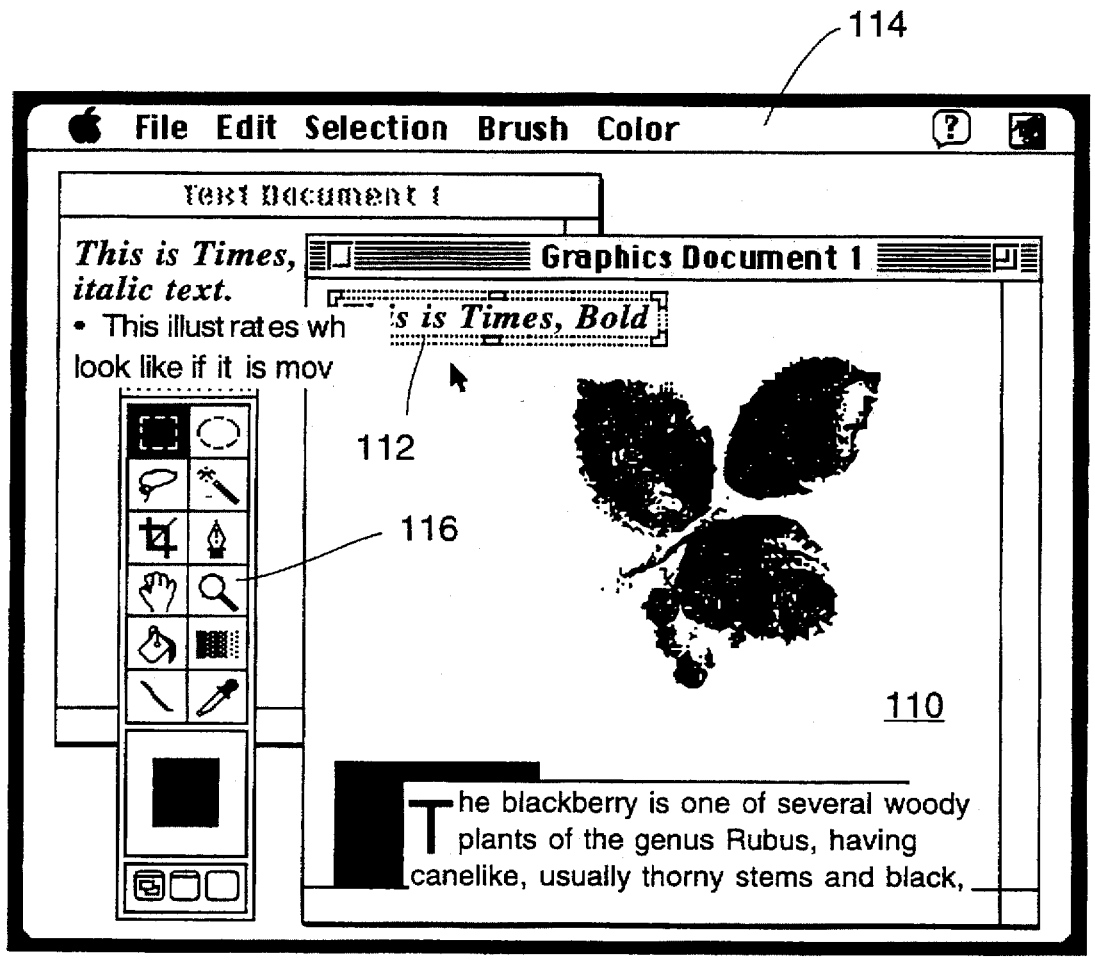

In the third scenario described above, the intrinsic contents of the donor document are of a different type and an incompatible category, relative to those of the destination document. Referring to FIG. 13A, selected text 104 from a text document 100 is to be copied into a graphic document 110. Again, the user drags a copy 105 of the selected text from the text document 100 to the graphic document 110, which is highlighted as soon as the cursor enters the destination document (FIG. 13B). Once the copy 105 of the text is in the appropriate location, the user releases the mouse button to drop the text into the graphic document. In this case, the category of the selected material, i.e. text, is not compatible with the intrinsic contents of the destination document, namely graphic elements. Therefore, the system creates a new part of the same type (text) as the donor document, inserts the copy of the selected material in it, and embeds the new part in the destination document. With this approach, the new part retains its own identity within the destination document. It has its own intrinsic content, i.e. text characters, and a text editor associated with it. Since the new material is a separate part, it resides within the graphic document as a frame 112, as illustrated in FIG. 13C. The frame 112 remains as the selected object, as illustrated by the border around the frame.

As the copy of the selected text was being moved from the text document to the graphics document, the menu bar 114 of the desktop retained the commands associated with a text document, as illustrated in FIGS. 13A and 13B. However, once the copied text was dropped into the graphics document, the commands available on the menu bar 114 switched from those appropriate for a text editor to those for a graphics editor, as illustrated in FIG. 13C. In addition, a tool bar 116 associated with the graphics editor appeared on the desktop, since the graphics document is now the active document in which the selected part is located. If, however, the user positions the cursor within the frame 112 and selects a character or a word, the tool bar 116 is removed and the commands in the menu bar 114 return to those appropriate for editing text.

Figure 14:
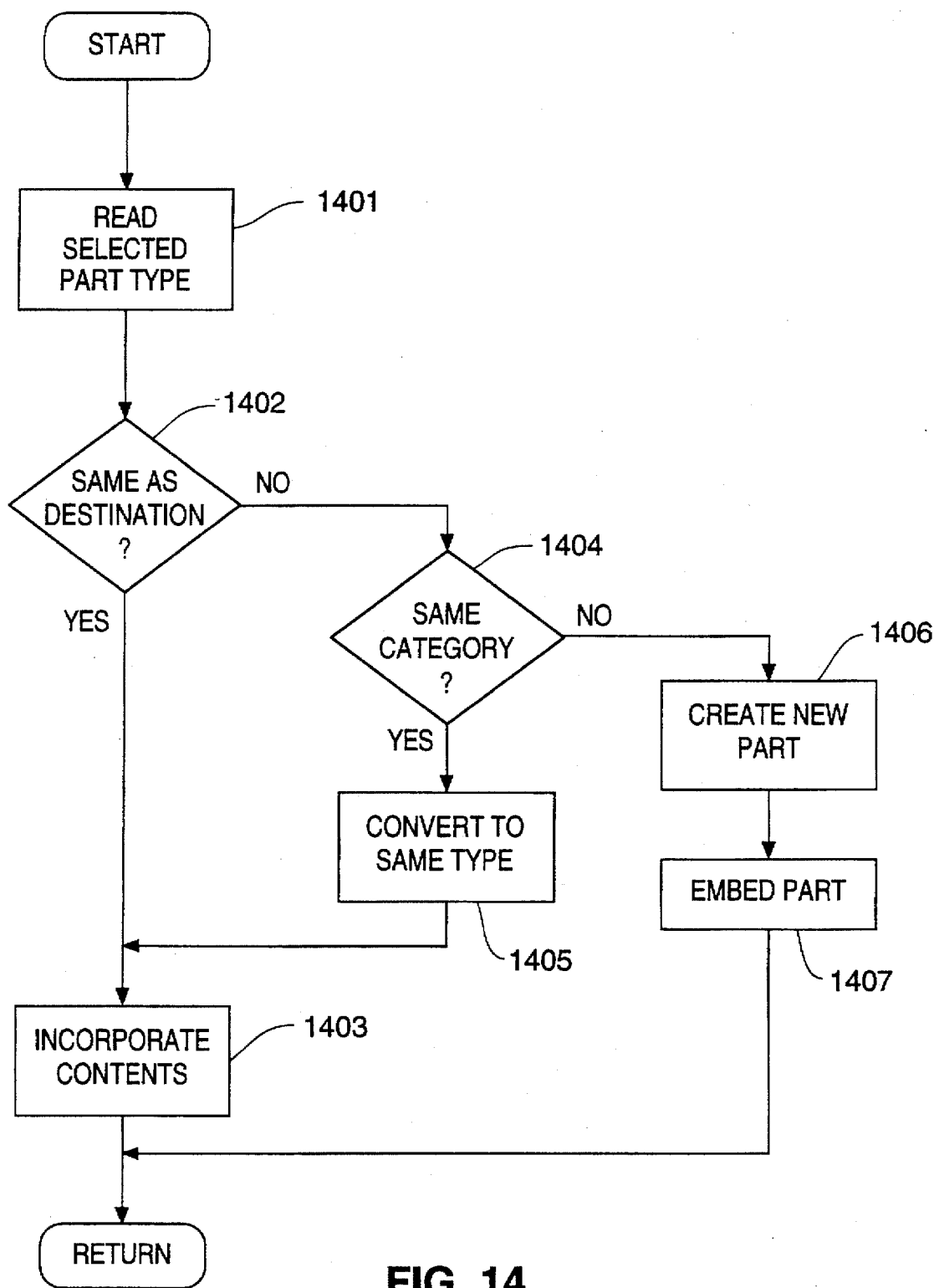
FIG. 14 is a flow chart of the process for placing material from one part into another part.

In summary, when contents are moved from one document to another, the system determines whether the contents can be incorporated into the destination document as part of its intrinsic contents, or must be embedded in the destination document as an autonomous part. The operation of the system to carry out this process is illustrated in the flow chart of FIG. 14. After the user has selected an object and dragged it to its intended destination, the system determines the type of part from which the selected object originated (Step 1401). For example, the selected object might be plain text, styled text, a graphic element, or the like. One of the properties that is stored with each part identifies which type of part it is, and each object which is moved or copied from the part is also identified as being of that type. After the part's type is identified, a determination is then made whether this type is the same as that of the destination document (Step 1402). If it is, the selected contents are incorporated or inserted into the destination document, to become part of its intrinsic content (Step 1403). If the selected information is not of the same type as the destination document, the system determines whether they belong to the same category (Step 1404). For example, if the selected information is styled text and the destination is plain text, they belong to the same category, although they are different types. If the selected information belongs to the same category as the destination document, the system converts the selected information into the same type as the destination document (Step 1405). For example, text that is generated by one word processor can be converted into the format employed by a different word processor, or graphic documents can be converted from one file format to another. Once the conversion is complete, the selected information is incorporated into the contents of the destination document (Step 1403). If the selected information is not of the same category as the destination document, a new part is created with the selected information as its contents (Step 1406), and this new part is embedded in the destination document as a frame (Step 1407).

Because of their autonomous nature, parts greatly facilitate the exchange of information between various users of a system. A document, i.e. a root part, can contain several other parts. A user can retrieve the entire document to view it and edit the individual parts as desired. Alternatively, the respective parts can be individually placed on a desktop that is shared by many users, while access to the document as a whole is protected.

Further along these lines, the individual parts can be protected with limited access rights. For example, a document containing several different parts may be intended for distribution to a number of different categories of people. Some of the parts may contain confidential information which is not to be revealed to some of the categories of people. In the context of the present invention, these individual parts can be protected with limited access rights, and their contents can be viewed only by those who have an appropriate password, or other form of access. In other words, access restrictability is another characteristic property of a part.

Figure 15:
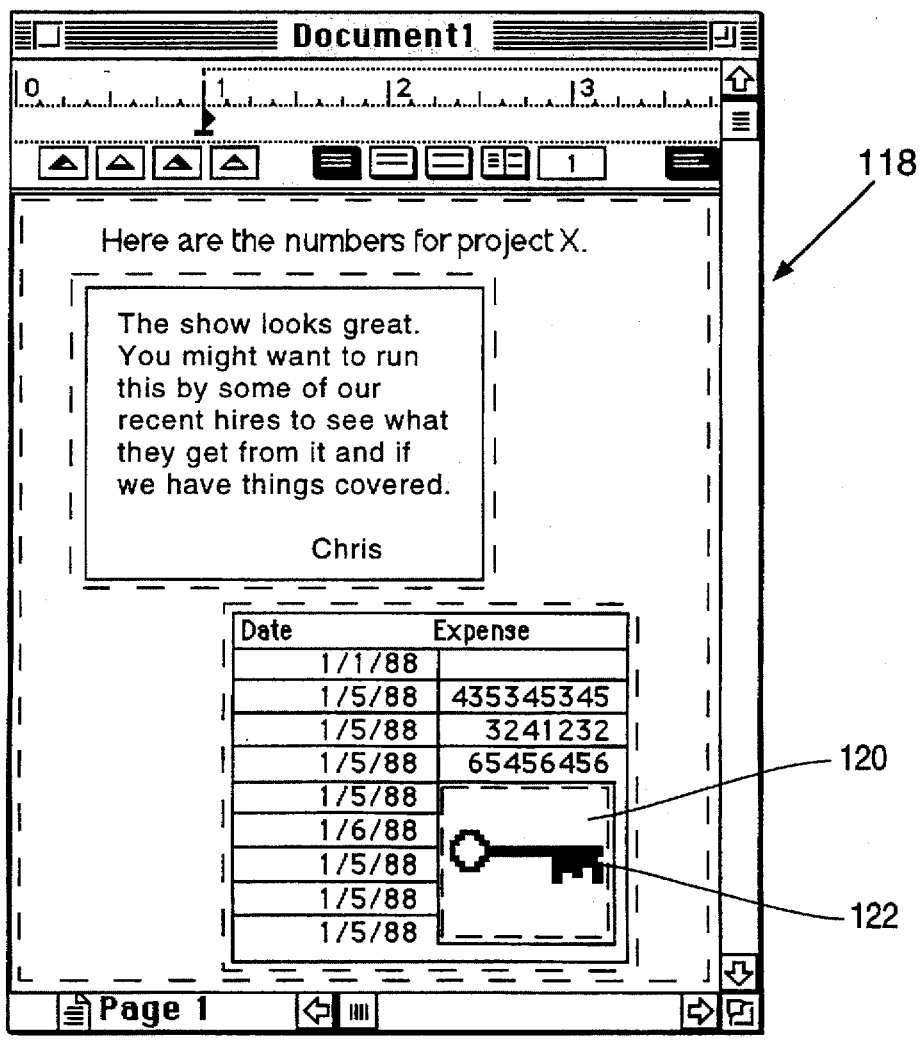
FIG. 15 is a screen display illustrating a part having restricted access.

Referring to FIG. 15, a document 118 is illustrated which is comprised of a number of parts, each of which is contained within a frame designated by dashed lines. One of the parts 120 is access protected. For example, this part may contain confidential spreadsheet data. Since the access to this part is limited, its contents are not displayed within the frame. Rather, the frame is opaque, and can include an appropriate symbol, such as a key 122, to indicate the fact that a password or the like is required to gain access to it.

The document 118 can be opened by users of the system, to view its general layout and the information in non-confidential parts. However, the data contained within the confidential part 120 can only be seen by those who have an appropriate password for accessing the part. When such a person selects the part, its opaque cover is removed and its contents are displayed.

Although its contents cannot be accessed, the other properties of a restricted part are still available to the users of the system who do not have the password. For example, the location of the part within the document can be changed, and it can be resized by selecting it and moving the resize handles on the border of its frame. Likewise, the limited access part can be copied for placement elsewhere. However, the access protection remains with the copy of the part wherever it is located.

A part with limited access rights can have other parts embedded in it. Consequently, if a user does not possess the appropriate password to obtain access to the contents of a part, the other parts contained within it will also be restricted from view. Once a password has been accepted, the password can be automatically passed to all of the embedded parts so that they are unlocked and viewable without further user involvement. Of course, however, the embedded parts could have different passwords associated with them, so that even if a viewer can obtain access to one restricted part, access to other parts within it may be further limited.

Thus, the present invention can limit access to the contents of a document on an intra-document level. The access rights are part-specific, and effective regardless of where the data in the part is located. This approach permits non-privileged parts of a document to be accessed by users without imposing document-wide access restrictions. In large documents having multiple authors, the ability to limit access on a part-by-part basis provides much more flexibility in the viewing of the document and collaboration by the authors.

Figure 16:
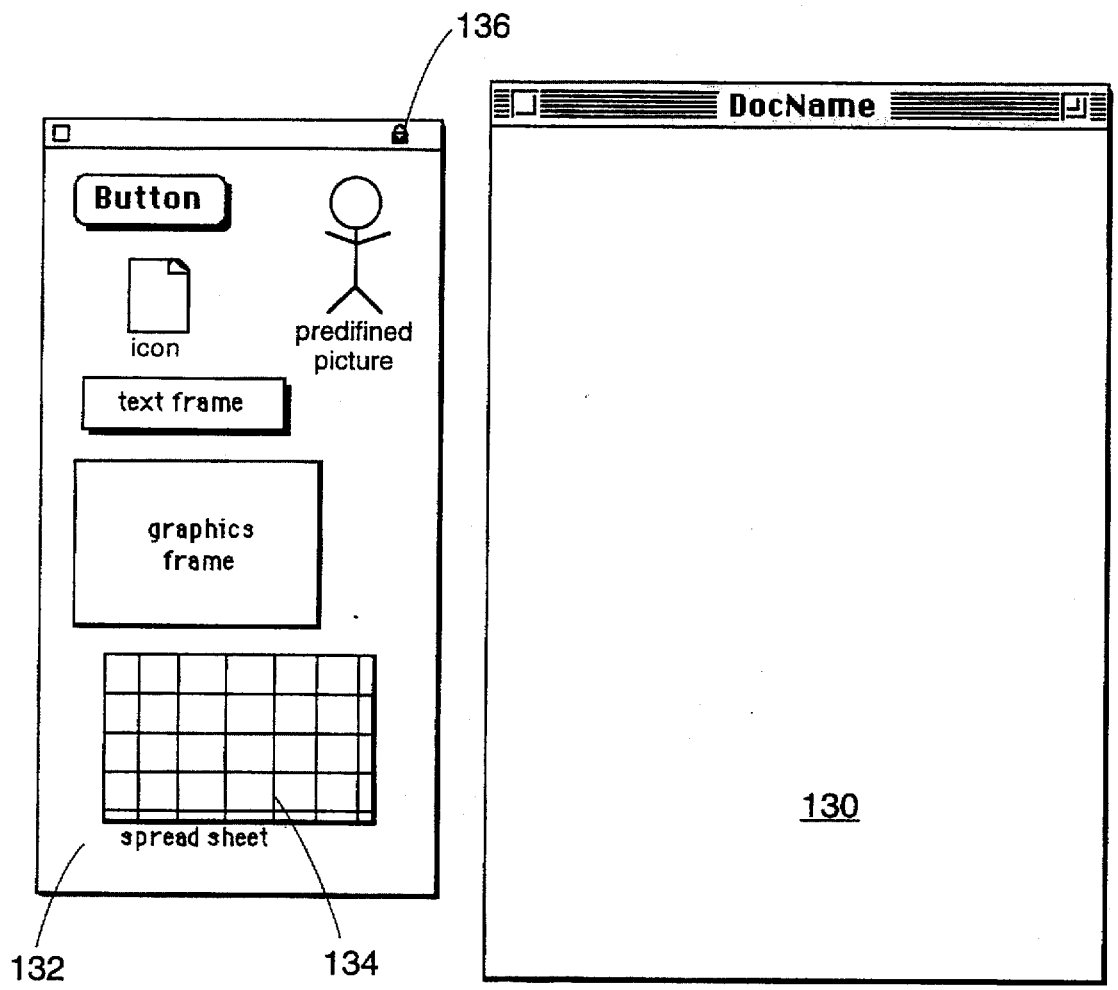
FIG. 16 is a screen display illustrating a parts bin.

To facilitate the manipulation of parts and compilation of compound documents, a special type of part, called a "parts bin", can be provided. An example of a parts bin is shown in FIG. 16. Referring thereto, a document is open in a window 130, and a parts bin 132 for the document appears in a separate area that is referred to as a windoid. The windoid is associated with the window 130, so that if the document window is brought to the front of the screen, the windoid comes along with it.

The parts bin 132 is essentially a user-defined palette which functions as a source for other parts. It contains only other parts and has no intrinsic contents. The parts inside a parts bin have the property of being "frozen". More particularly, when a user normally depresses the mouse button while the cursor is located within a frame, the smallest element at the location of the cursor is selected. Referring to FIG. 16, in the normal case, if the cursor is placed on one cell of a spreadsheet frame 134 and the cursor control button is depressed, the contents of that cell would be selected. The user may have intended to select a different object, e.g. the entire spreadsheet which contains the cell that was actually selected. To do so, the user must move the cursor to another area within the frame, but outside of other parts embedded within the desired part. This requirement is eliminated by freezing parts in a parts bin, however. In this case, the user can click the mouse with the cursor located anywhere on a part and select the entire part. Thus, parts located within parts bins are dealt with as a whole, even if they are represented as frames which contain other embedded parts.

The parts in a parts bin can also be locked so that their contents cannot be modified. The locked property of the parts bin can be denoted by a padlock symbol 136 in the windoid's header. If a user attempts to drag a part out of a locked parts bin, a copy of the part is automatically made, and the original part remains in the parts bin, thereby ensuring the integrity of the bin's contents. To enable users to customize their parts bins, the lock on a parts bin can be turned off, for example by clicking on the padlock symbol 136, and the parts modified.

In a further embodiment of this aspect of the invention, every document can have an associated parts bin. A "document parts bin" enables a standard set of parts to be bundled with a document, so that users of that document will have those parts readily available to them. By activating a command, the user can cause the document parts bin to be displayed in a windoid or the like. A document with an associated parts bin can have a restrictive property placed on it, so that the only parts which can be placed in the document are those within the bin. An attempt to place other parts into the restricted document is rejected. This property ensures that users of the document work only with a certain set of parts, thereby reducing the training, support and maintenance associated with the document. For example, the parts bin for a data entry form will have only the parts necessary to enter data in the form. As a result, untrained users will not be exposed to unexpected parts, which could otherwise be used improperly. The restriction on parts also allows an organization to control the contents of documents.

In addition to the user benefits described above, the architecture of the present invention provides benefits to the software developer. For example, a spreadsheet program is primarily designed to process numbers, and a developer who has expertise in this area can most efficiently spend time on this function. However, a text editor is a necessary part of a spreadsheet application, since the users must be able to edit the text in formulas and values. Having to write a text editor is a distraction for the developer of spreadsheet programs, although necessary with the conventional programs. However, in an arrangement in which a user-selected text editor is available for use as a separate part in a spreadsheet, it is no longer necessary for the spreadsheet developer to write a text editor. The developer's time can be devoted to the essence of the spreadsheet program, enabling extra features to be implemented, which may not be otherwise available because of time previously devoted to developing other features that were incidental to the number processing function of the spreadsheet.

In addition, when the software developer decides to subsequently add new features or correct existing bugs, the task is made much easier. In particular, the developer need only concentrate on the spreadsheet aspects of the program, and need not be concerned with incidental components, such as a text editor.

It will be appreciated that the present invention is not limited to the specific embodiments which have been described herein to facilitate an understanding of its underlying principles. For example, text and graphics have been used in the illustrative examples to represent the components of a document. The contents of a part are not limited to these two specific categories, however. Rather, the contents of a part could be any type of media, including video, sound, animation, and the like. The scope of the invention, therefore, is defined by the claims which are appended hereto, rather than the foregoing description, and all equivalents which are consistent with the meaning of the claims are intended to be embraced therein.

What is claimed is:

1. In a computer system for the creation and/or manipulation of compound documents, wherein a first component of a document is embedded in a second, containing component of the document and each component includes associated contents and a manipulator for those contents, an interface arrangement for defining the relationship between said first and second components, said arrangement comprising:

means storing a first data structure containing information that is shared between said first and second components, said stored information including a first shape that is determined by said second component and which defines an area within said second component that is available for the placement of the contents of said first component, and a second shape that is determined by said first component and which defines the portion of said area in which the contents of said first component are actually located; and means storing a second data structure associated with the first data structure and containing information regarding the geometric relationship between said first and second components, said information stored in the second data structure including a third shape that is determined by said second component and which defines a portion of said area in which the contents of said first component can be displayed.

2. The interface arrangement of claim 1, wherein the shared information contained in said second data structure further includes a fourth shape that is determined by said first component and which defines the portion of said third shape in which user input to said system is passed on to the manipulator for said first component.

3. The interface arrangement of claim 1, wherein said second data structure contains information defining a translucent shape that identifies an area of a first component that obscures contents of a second component, and an overlapped shape that identifies an area of a first component that is obscured by contents of a second component.

4. The interface arrangement of claim 1 wherein said first data structure stores information which specifies a geometric transformation that is applied to all commands that are used to display the contents of said first component.

5. The interface arrangement of claim 4 wherein said second data structure also stores information which specifies a geometric transformation that is applied to all commands that are used to display the contents of said first component.

6. The interface arrangement of claim 1, wherein said first shape is rectangular.

7. The interface arrangement of claim 1, wherein said first shape is non-rectangular.

8. A method for producing a compound document in a computer system of the type in which components of the document are stored as parts having contents and each part has an associated manipulator for its contents, wherein the compound document comprises a first part which is embedded within a second part, said method comprising the steps of:

determining an area within the contents of said second part that is to be allotted to the contents of the first part;

establishing a frame shape corresponding to said area and notifying the manipulator for the first part of said frame shape;

determining, by means of the manipulator for the first part, the layout of the contents of said first part within said frame shape and determining a used shape corresponding to a subset of said area that is occupied by the contents of said first part, and notifying the manipulator for the second part of said used shape;

determining, by means of the manipulator for said first part, an active shape which corresponds to a subset of said used shape and which is independent of said frame shape and said used shape;

detecting user input events pertaining to the manipulation of the contents of the document;

determining whether a user input event occurs within said active shape;

presenting a detected user input event to the manipulator for said first part when it is determined to have occurred within said active shape; and responding to said detected user input by means of the manipulator for said first part.

9. The method of claim 8 further including the step of displaying at least some of the contents of said second part in said area outside of said used shape.

10. The method of claim 9 further including the steps of changing said used shape by means of the manipulator for said first part, informing the second part of the changed used shape, and altering the display of contents of said second part in accordance with the changed used shape.

11. The method of claim 8 further including the steps of determining a clipping shape which defines an area within said frame shape in which the contents of said first part can be displayed, providing a notification to said first part regarding said clipping shape, and displaying the contents of said first part only within the area of said clipping shape.

12. The method of claim 11 further including the steps of:

defining a translucent shape that identifies an area of said clipping shape that obscures contents of said second part, providing a notification to said second part of said translucent shape, providing information from said second part to said first part of the contents of said second part within said translucent shape, and altering the display of said contents in accordance with the obscuration provided by said first part.

13. The method of claim 11 further including the steps of:

defining an overlapped shape that identifies an area of said clipping shape that is obscured by contents of said second part, providing a notification to said first part of said overlapped shape, providing information from said first part to said second part of the contents of said first part within said overlapped shape, and altering the display of said contents in accordance with the obscuration provided by said second part.

14. The method of claim 13 further including the steps of:

providing a notification from said first part to said second part whenever the contents of said first part within said overlapped shape are changed, and altering the display of said changed contents in accordance with the obscuration provided by said second part.

15. In a computer system of type in which a compound document comprises at least two parts where one part, the embedded part, is contained within the other part, the container part, and each part is comprised of contents and an associated manipulator for its contents, a method for providing a graphic display of the compound document, comprising the steps of:

storing a frame data structure which includes information regarding a frame shape, which defines an area within the container part that is available for the embedded part, and a used shape, which defines an area within the frame shape that is actually used by the embedded part;

determining a frame shape by means of said container part and providing a notification of the frame shape to said frame data structure;

transforming the frame shape from coordinate space of the container part to coordinate space of the embedded part;

providing the embedded part with a notification of the transformed frame shape;

determining, by means of said embedded part, a used shape which conforms to the frame shape;

providing the container part with a notification of the determined used shape; and displaying at least some of the contents of said embedded part within the area of said used shape.

16. The method of claim 15 wherein the determination of a frame shape by said container part is carried out in response to a request from said embedded part.

17. The method of claim 15 further including the steps of storing a facet data structure which includes information regarding a clipping shape, which defines an area within said frame shape in which the contents of said embedded part can be displayed, determining said clipping shape in said container part, providing a notification to said embedded part regarding said clipping shape, and displaying the contents of said embedded part only within the area of said clipping shape.

18. The method of claim 17 wherein said facet data structure further includes information defining a translucent shape that identifies an area of said clipping shape that obscures contents of said container part, and further including the steps of:

providing a notification to said container part of said translucent shape, providing information from said container part to said embedded part of the contents of said container part within said translucent shape, and altering the display of said contents in accordance with the obscuration provided by said embedded part.

19. The method of claim 17 wherein said facet data structure further includes information defining an overlapped shape that identifies an area of said clipping shape that is obscured by contents of said container part, and further including the steps of:

providing a notification to said embedded part of said overlapped shape, providing information from said embedded part to said container part of the contents of said embedded part within said overlapped shape, and altering the display of said contents in accordance with the obscuration provided by said container part.

20. The method of claim 19 further including the steps of providing a notification from said embedded part to said container part whenever the contents of said embedded part within said overlapped shape are changed, and altering the display of said changed contents in accordance with the obscuration provided by said container part.

21. The method of claim 17 wherein said facet data structure includes information defining a geometric transformation, and further including the steps of applying said transformation to all of the contents of said clipping shape.

22. The method of claim 17 wherein said frame data structure includes information defining a geometric transformation, and further including the steps of applying said transformation to all contents displayed within said clipping shape.

23. The method of claim 15 further including the step of displaying at least some of the contents of said container part in an area within said frame shape and outside of the area of said used shape.

24. The method of claim 23 further including the steps of changing said used shape by means of the manipulator for said embedded part, informing the container part of the changed used shape, and altering the display of contents of said container part in accordance with the changed used shape.

25. The method of claim 15 wherein said frame shape is rectangular.

26. The method of claim 15 wherein said frame shape is non-rectangular.

* * * * *